US010816808B2

(12) United States Patent
Hori et al.

(10) Patent No.: US 10,816,808 B2
(45) Date of Patent: *Oct. 27, 2020

(54) HEAD-MOUNTED DISPLAY APPARATUS, INFORMATION PROCESSING DEVICE, SYSTEM, AND METHOD FOR CONTROLLING USE OF CAPTURED IMAGES FROM HEAD-MOUNTED DISPLAY APPARATUS

(71) Applicant: SEIKO EPSON CORPORATION, Tokyo (JP)

(72) Inventors: Fumiya Hori, Ueda (JP); Chiho Tachikawa, Ueda (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/212,789

(22) Filed: Dec. 7, 2018

(65) Prior Publication Data
US 2019/0179148 A1 Jun. 13, 2019

(30) Foreign Application Priority Data

Dec. 8, 2017 (JP) ................. 2017-236422

(51) Int. Cl.
*G02B 27/01* (2006.01)
*H04N 5/232* (2006.01)
(Continued)

(52) U.S. Cl.
CPC ....... *G02B 27/0172* (2013.01); *G02B 27/017* (2013.01); *G06F 3/011* (2013.01);
(Continued)

(58) Field of Classification Search
CPC .............. G02B 27/0172; G02B 27/017; G02B 2027/0138; G02B 2027/014;
(Continued)

(56) References Cited

U.S. PATENT DOCUMENTS 7,619,657 B2 11/2009 Watanabe et al.
10,078,644 B1 * 9/2018 Newman ................. G06F 16/78
(Continued)

FOREIGN PATENT DOCUMENTS

JP 2006-164048 A 6/2006
JP 2006-208997 A 8/2006
(Continued)

Primary Examiner — Darlene M Ritchie
(74) Attorney, Agent, or Firm — Oliff PLC

(57) ABSTRACT

An HMD mounted on a head of a user includes a storage unit configured to store process flow data that defines a process flow including a plurality of work blocks in which an order of execution is predetermined, a camera configured to capture an external scene, and a control unit configured to execute the process flow according to the process flow data. At least any one of the plurality of work blocks in the process flow data includes a setting that determines whether use of captured image data of the camera is permitted. The control unit controls, when executing the process flow, propriety of using the captured image data in each of the work blocks according to the setting of the process flow data about the work block.

15 Claims, 15 Drawing Sheets

(51) Int. Cl.
*G06F 3/0484* (2013.01)
*G06F 3/01* (2006.01)
*G06F 1/16* (2006.01)

(52) U.S. Cl.
CPC .... *G06F 3/04847* (2013.01); *G02B 2027/014* (2013.01); *G02B 2027/0138* (2013.01); *G02B 2027/0178* (2013.01); *G06F 1/163* (2013.01); *H04N 5/23245* (2013.01)

(58) Field of Classification Search
CPC .. G02B 2027/0178; H04N 5/76; H04N 5/775; H04N 5/23245; G06F 3/04847; G06F 3/04845; G06F 3/011; G06F 8/34; G06F 1/1686; G06F 1/163
See application file for complete search history.

(56) References Cited

U.S. PATENT DOCUMENTS

| | | | |
|---|---|---|---|
| 2005/0001024 A1* | 1/2005 | Kusaka | H04N 1/00281 235/375 |
| 2009/0115892 A1 | 5/2009 | Sako et al. | |
| 2013/0215446 A1 | 8/2013 | Imai | |
| 2014/0031001 A1 | 1/2014 | Jacobsen | |
| 2014/0351896 A1* | 11/2014 | Koo | G06F 21/10 726/4 |
| 2017/0124338 A1 | 5/2017 | Oonishi et al. | |
| 2017/0151034 A1* | 6/2017 | Oda | A61B 90/361 |
| 2017/0213377 A1 | 7/2017 | Torii et al. | |
| 2017/0277221 A1 | 9/2017 | Degawa et al. | |
| 2018/0357870 A1* | 12/2018 | Siminoff | G08B 13/19606 |
| 2020/0019234 A1 | 1/2020 | Chehade et al. | |

FOREIGN PATENT DOCUMENTS

| | | |
|---|---|---|
| JP | 2006-319575 A | 11/2006 |
| JP | 2008-124885 A | 5/2008 |
| JP | 2014-107831 A | 6/2014 |
| JP | 5903375 B2 | 4/2016 |
| JP | 2016-212345 A | 12/2016 |
| JP | 2017-183826 A | 10/2017 |
| WO | 2015/189994 A1 | 12/2015 |

* cited by examiner

| TERMINAL IDENTIFICATION INFORMATION | HMD IDENTIFICATION INFORMATION (57) | USER ID | PASSWORD | IMAGE IDENTIFICATION INFORMATION |
|---|---|---|---|---|
| 00112233 | 13579 | ababab | 9a8b7c | 0001 |
| | | | | 0002 |
| | | cccffff | ert-333 | 0001 |
| | | | | 0002 |
| 99887766 | 24680 | hhhooo | 2345abc | 0001 |
| | | | | 0002 |
| ... | ... | ... | ... | ... |

Fig. 2

HEAD-MOUNTED DISPLAY APPARATUS, INFORMATION PROCESSING DEVICE, SYSTEM, AND METHOD FOR CONTROLLING USE OF CAPTURED IMAGES FROM HEAD-MOUNTED DISPLAY APPARATUS

BACKGROUND

1. Technical Field

The present invention relates to a head-mounted display apparatus, an information processing device, an information processing system, and a method for controlling a head-mounted display apparatus.

2. Related Art

A head-mounted display apparatus that is mounted on a head of a user and displays an image visually recognizable by the user has been known (for example, see JP-A-2016-212345). This head-mounted display apparatus is equipped with various functions, and the functions have been improving. Thus, when the head-mounted display apparatus is used at a work site, measures against a leak of information are needed.

JP-A-2016-212345 discloses a head-mounted display apparatus including a function of limiting a capturing function.

When the head-mounted display apparatus is used for work support, captured image data may be desired to be stored by causing an imaging unit of the head-mounted display apparatus to perform capturing depending on a work scene. However, when capturing is limited by a function of a basic control program (OS) installed in the head-mounted display apparatus, only whether the capturing function is uniformly limited can be set. This causes a decrease in convenience.

SUMMARY

An advantage of some aspects of the invention is to achieve securing of security and improvement in user convenience by controlling propriety of using captured image data for each operation step.

To solve the above-described problems, the invention is a head-mounted display apparatus mounted on a head of a user. The head-mounted display apparatus includes a storage unit configured to store control data that defines an operation flow including a plurality of operation steps in which an order of execution is predetermined, an imaging unit configured to capture an external scene, and a control unit configured to execute the operation flow according to the control data. At least any one of the plurality of operation steps in the control data includes a setting that determines whether use of captured image data of the imaging unit is permitted. The control unit controls, when executing the operation flow, propriety of using the captured image data in each of the operation steps according to the setting of the control data about the operation step.

According to this configuration, when executing the control data, the control unit can control the propriety of using the captured image data for each of the operation steps. Therefore, securing of security and improvement in user convenience can be achieved by controlling the propriety of using the captured image data for each of the operation steps.

In the invention, the control unit switches, when executing the operation step, the imaging unit between a state of being operated and a state of being stopped according to the setting of the control data about the operation step.

According to this configuration, switching the operating state of the imaging unit can be performed by causing the control unit to execute the control data.

The invention includes an image storage unit configured to store captured image data of the imaging unit. The control unit controls, when executing the operation step, whether to use captured image data of the imaging unit stored in the image storage unit according to the setting of the control data about the operation step.

According to this configuration, the propriety of using the captured image data stored in the image storage unit can be controlled by causing the control unit to execute the control data.

In the invention, when executing the operation step including processing of capturing an image including code information, the control unit controls use of captured image data of the imaging unit, extracts the code information from the captured image data of the imaging unit, and causes the storage unit to store the code information.

According to this configuration, when the processing of capturing an image including code information is performed, the code information can be extracted from the captured image data.

In the invention, when executing the operation step including the processing of capturing an image including code information, the control unit determines a number of usable times of the captured image data based on the code information extracted from the captured image data, and allows the captured image data to be used in another operation step included in the operation flow with the number of usable times as an upper limit.

According to this configuration, an upper limit of the number of usable times of the captured image data can be set.

In the invention, when executing the operation step in which the captured image data is set to be usable, the control unit allows use of the captured image data corresponding to capturing by the imaging unit for a plurality of times.

According to this configuration, capturing for a plurality of times can be performed in the operation step in which the captured image data is set to be usable.

The invention includes a notification unit. The control unit makes notification by the notification unit when the captured image data of the imaging unit stored in the image storage unit is stored in the storage unit.

According to this configuration, the notification that the captured image data is stored in the storage unit can be made.

To solve the above-described problems, the invention is an editing device allowed to edit control data that defines an operation flow including a plurality of operation steps in which an order of execution is determined. The editing device includes an input unit configured to accept an input, a display unit configured to cause a display face to perform displaying, and a control unit configured to cause the display face to display a work screen including a work region, arrange objects each indicating the operation step and including an image indicating a content of the operation step in the work region in accordance with an input accepted by the input unit, create the operation flow based on arrangement of the objects in the work region, and generate the control data that defines the operation flow created. The control data includes a setting that determines whether use of captured image data of an imaging unit is permitted for at least any one of the operation steps.

According to this configuration, the operation flow set with whether use of the captured image data of the imaging unit is permitted for each of the operation steps in the operation flow can be created.

The invention includes a connection unit attached to a head-mounted display apparatus. The control unit outputs the control data that defines the operation flow created to be associated with the head-mounted display apparatus to the head-mounted display apparatus connected to the connection unit.

According to this configuration, the control data created to be associated with the head-mounted display apparatus is output to the head-mounted display apparatus, and the control data can be executed by the head-mounted display apparatus.

In the invention, a plurality of the head-mounted display apparatuses are allowed to be connected to the connection unit, and the control unit outputs the control data that defines the operation flow created to be associated with each of the plurality of head-mounted display apparatuses to the head-mounted display apparatus connected to the connection unit.

According to this configuration, the control data created to be associated with each of the plurality of head-mounted display apparatuses is output to the corresponding head-mounted display apparatus, and the control data can be executed by the corresponding head-mounted display apparatus.

To solve the above-described problems, the invention is an information processing system that includes a head-mounted display apparatus mounted on a head of a user and an information processing device. The head-mounted display apparatus includes a first communication unit configured to perform communication, a storage unit configured to store control data that defines an operation flow including a plurality of operation steps in which an order of execution is predetermined, an imaging unit configured to capture an external scene, and a first control unit configured to execute the operation flow according to the control data. At least any one of the operation steps in the control data includes a setting that determines whether use of captured image data of the imaging unit is permitted. The first control unit controls, when executing the operation flow, propriety of using the captured image data in each of the operation steps according to the setting of the control data about the operation step, and sends, when use of the captured image data is permitted, the captured image data captured by the imaging unit from the first communication unit to the information processing device.

According to this configuration, the propriety of using the captured image data in each of the operation steps can be controlled. When the use of the captured image data is permitted, the captured image data being captured can be sent to the information processing device. Therefore, when the use of the captured image data is permitted, sending the captured image data being captured to the information processing device can prevent a leak of the captured image data to the outside and secure security.

In the invention, the first control unit adds limited information limiting use of the captured image data to the captured image data and sends the captured image data to the information processing device.

According to this configuration, a leak of the captured image data to the outside can be prevented more efficiently, and security can be secured.

In the invention, the first control unit adds first identification information identifying the head-mounted display apparatus to the captured image data and sends the captured image data to the information processing device.

According to this configuration, a leak of the captured image data to the outside can be prevented more efficiently, and security can be secured.

In the invention, the information processing device includes a second communication unit configured to perform communication, a data storage unit configured to associate the captured image data received from the head-mounted display apparatus with the first identification information, and store the data, an identification information storage unit configured to associate second identification information identifying an external device in which the captured image data is usable with the first identification information of the head-mounted display apparatus from which the external device corresponding to the second identification information is allowed to acquire captured image data, and store the information, and a second control unit configured to determine, when receiving the second identification information from the second communication unit, whether the second identification information coinciding with the second identification information received is stored in the identification information storage unit, and send, when the second identification information that is identical is stored in the identification information storage unit, the captured image data in the first identification information associated with the second identification information that is identical to the external device that has received the second identification information.

According to this configuration, a leak of the captured image data to the outside can be prevented more efficiently, and security can be secured.

To solve the above-described problems, the invention is a method for controlling a head-mounted display apparatus mounted on a head of a user. The method for controlling a head-mounted display apparatus includes executing control data that defines an operation flow including a plurality of operation steps in which an order of execution is predetermined, and controlling the imaging unit according to a setting that determines whether capturing by an imaging unit is permitted, the setting being included in each of the plurality of operation steps to be executed.

According to this configuration, when executing the control data, the control unit can control the propriety of using the captured image data in each of the operation steps. Therefore, securing of security and improvement in user convenience can be achieved by controlling the propriety of using the captured image data for each of the operation steps.

BRIEF DESCRIPTION OF THE DRAWINGS

The invention will be described with reference to the accompanying drawings, wherein like numbers reference like elements.

FIG. 2 shows a diagram illustrating an information management table.

DESCRIPTION OF EXEMPLARY EMBODIMENTS

Figure 1:
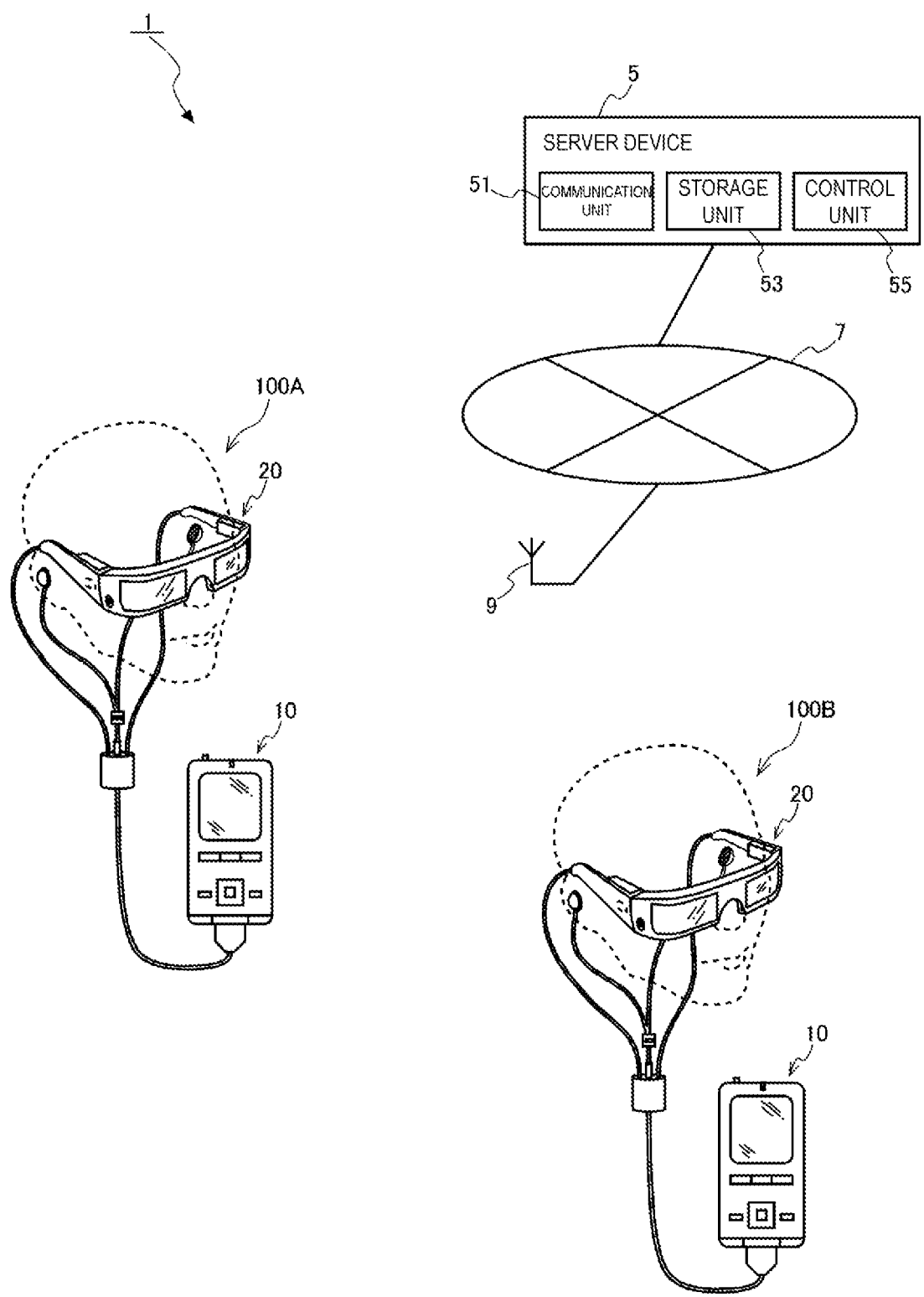
FIG. 1 shows a system block diagram.

FIG. 1 is a system block diagram of an information processing system 1.

The information processing system 1 includes, as a system configuration, a configuration in which a plurality of head-mounted display apparatuses (hereinafter expressed as head mounted displays (HMDs)) 100 are connected to a server device 5 through a communication network 7. FIG. 1 illustrates two HMDs 100 being an HMD 100A and an HMD 100B, but the number of the HMDs 100 is not limited to two and is arbitrary. Further, when the HMD 100A and the HMD 100B do not need to be distinguished from each other hereinafter, the HMD 100A and the HMD 100B are expressed as the HMD 100.

The communication network 7 is achieved by various communication lines, such as wireless communication lines including a public network, dedicated lines, and cellular phone lines, and communication lines of a backbone of these lines, or by a combination of the various communication lines. A specific configuration of the communication network 7 is not limited. The communication network 7 may be a wide-area communication network that can connect remote places, or a local area network (LAN) laid in specific facilities and buildings. Further, the communication network 7 may include a network appliance such as a server device, a gateway device, and a router device connecting the various communication lines described above.

The HMD 100 performs data communication with the other HMD 100 and the server device 5 through a wireless access point 9. The wireless access point 9 is a communication device such as an access point and a router, and relays data communication between the HMD 100A and the HMD 100B and relays data communication between the HMDs 100A and 100B and the communication network 7.

The server device 5 includes a communication unit 51, a storage unit 53, and a control unit 55. The server device 5 corresponds to an "information processing device" of the invention. The communication unit 51 corresponds to a "second communication unit" of the invention. The storage unit 53 corresponds to a "data storage unit" and an "identification information storage unit" of the invention. The control unit 55 corresponds to a "second control unit" of the invention.

The communication unit 51 is connected to the communication network 7, and performs data communication with the HMD 100A, the HMD 100B, and another device connected to the communication network 7.

The storage unit 53 is formed of, for example, an auxiliary storage device such as a hard disk device and a semiconductor storage device. The storage unit 53 stores a control program executed by the control unit 55 and captured image data received from the HMD 100. Further, the storage unit 53 stores an information management table 57.

FIG. 2 is a diagram illustrating a configuration of the information management table 57.

The information management table 57 is a table in which HMD identification information, user identification information such as a user ID and a password, and image identification information are associated with terminal identification information and registered.

The HMD identification information is identification information about the HMD 100. The HMD 100A and the HMD 100B are provided with different HMD identification information, and can be distinguished from each other based on the HMD identification information. For example, a media access control (MAC) address and an Internet protocol (IP) address can be used as the HMD identification information. Further, the HMD identification information may be set independently by a system manager of the information processing system 1.

The user ID and the password included in the user identification information are information identifying each user using the information processing system 1. When a plurality of users use one HMD 100, each of the users using the HMD 100 needs to be identified. Thus, the user identification information is associated with the HMD identification information and registered in the information management table 57.

The image identification information is identification information about captured image data received from the HMD 100. The image identification information may be provided by the HMD 100 before captured image data is sent to the server device 5, or by the server device 5. The image identification information is associated with the HMD identification information and the user identification information and registered in the information management table 57 to identify a user who sends captured image data and the HMD 100 that receives the captured image data.

The terminal identification information is identification information identifying a terminal device (external device) permitted to download captured image data from the server device 5. The terminal identification information corresponds to "second identification information" of the invention. A media access control (MAC) address and an Internet protocol (IP) address may be used as the terminal identification information, and a system manager of the information processing system 1 may independently set the terminal identification information.

In the exemplary embodiment, a case where a terminal device permitted to download captured image data is set for each HMD 100 is described. Thus, the terminal identification information is associated with the HMD identification information and registered in the information management table 57. The terminal identification information is, for example, identification information about a terminal device used by a manager who manages a worker.

Further, identification information about the manager (manager identification information) may be associated with user information about a user who is a subordinate of the manager and registered in the information management table 57. An ID and a password of the manager are used as the manager identification information. For this configuration, the manager inputs the ID and the password to log in to the server device 5, and can download, from the server device 5, captured image data uploaded to the server device 5 by a worker managed by the manager.

The control unit 55 includes a CPU, a ROM, a RAM, and the like (none of which are illustrated) as hardware. The RAM is used as a work area of the CPU. The CPU decompresses a control program read from the ROM and a storage unit (not illustrated) in the RAM, and controls each of the units of the server device 5 by executing the decompressed control program. The control unit 55 may include one CPU (or semiconductor chip) or include a plurality of CPUs (or semiconductor chips).

Figure 3:
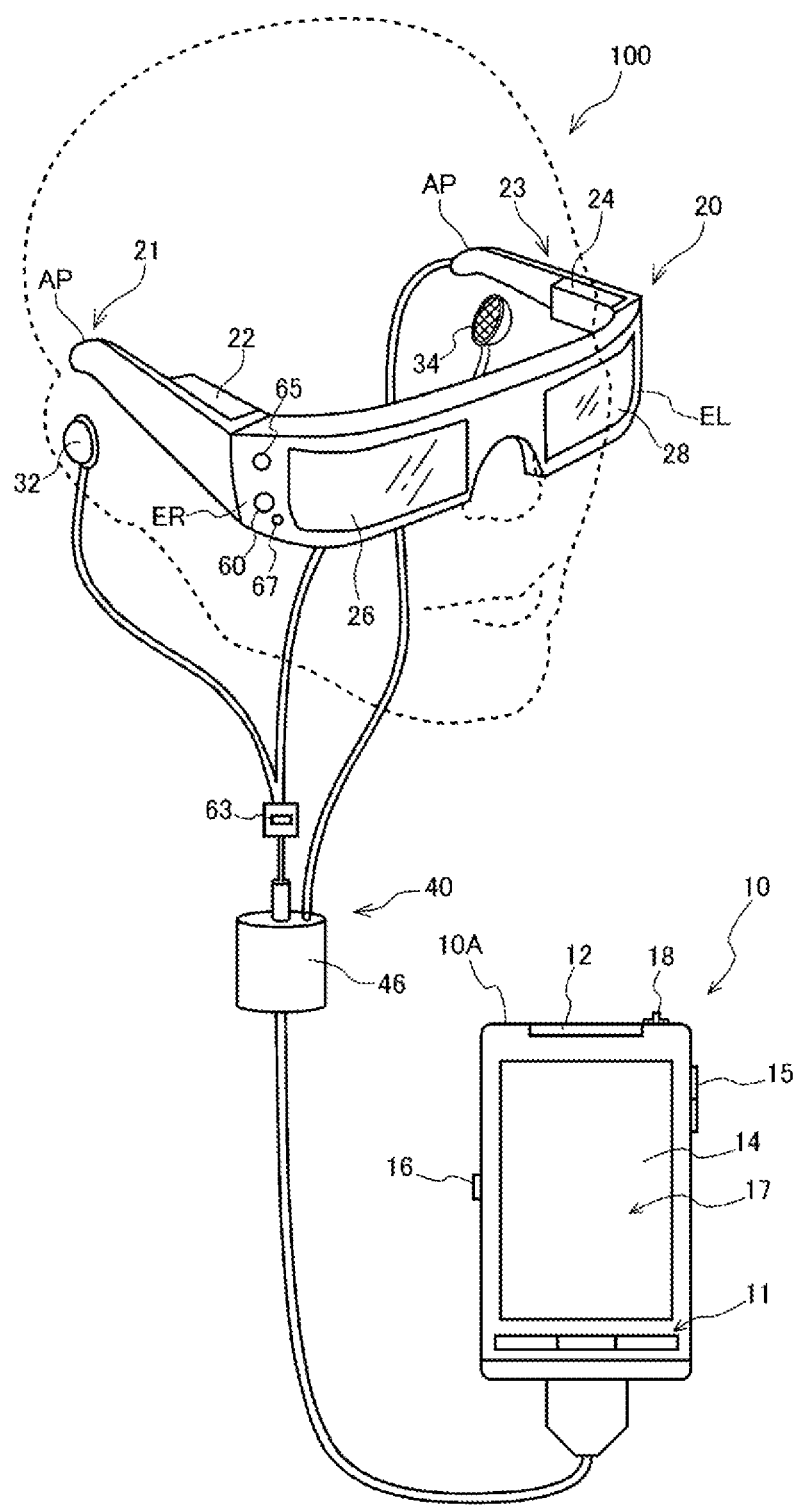
FIG. 3 shows a diagram illustrating an external configuration of an HMD.

FIG. 3 is a diagram illustrating an external configuration of the HMD 100. Since the HMD 100A and the HMD 100B have almost the same configuration, a configuration of the HMD 100 will be described below. The HMD 100 is a display device including a control device 10 and an image display unit 20.

The control device 10 includes an operation unit that accepts an operation by the user and functions as a controller with which the user operates the HMD 100. The control device 10 accepts the operation by the user and controls the image display unit 20 in accordance with the accepted operation. The image display unit 20 is mounted on a head of a user and causes the user to visually recognize a virtual image. The user represents a person who wears the image display unit 20 on the head.

Figure 6:
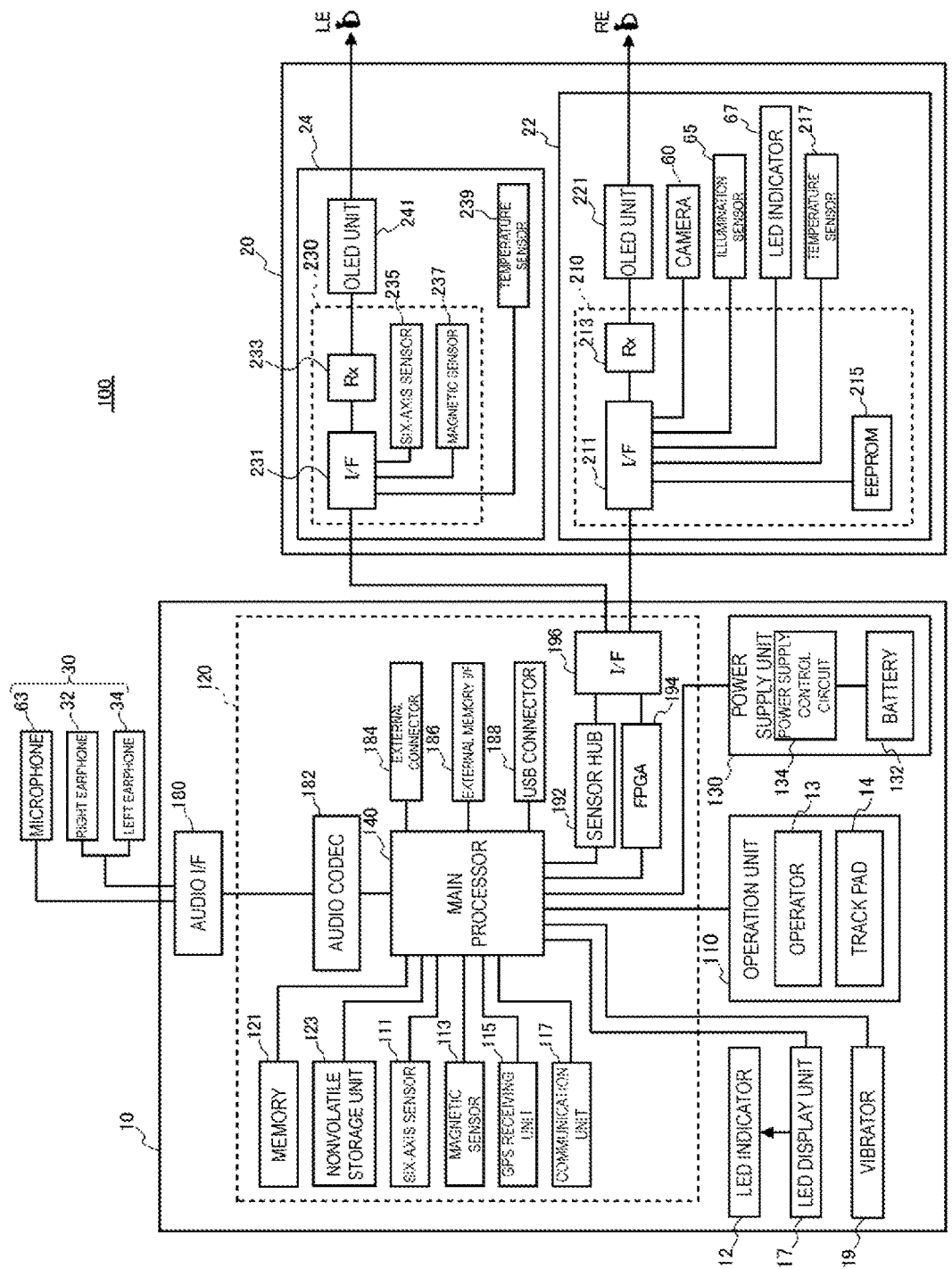
FIG. 6 shows a block diagram of the HMD.

The control device 10 includes a flat box-shaped case 10A (also may be referred to as a housing or a main body) as illustrated in FIG. 3. The case 10A includes respective units of an operation button 11, an LED indicator 12, a track pad 14, up and down keys 15, a switching switch 16, and a power switch 18. The operation button 11, the up and down keys 15, the switching switch 16, and the power switch 18 are collectively referred to as an operator 13 (FIG. 6). The user can operate the HMD 100 by operating the operator 13 and the track pad 14.

The operation button 11 includes a menu key, a home key, a return key, and the like, and particularly, the keys and switches that are displaced by a pressing operation. The LED indicator 12 lights up or blinks in accordance with an operating state of the HMD 100.

The track pad 14 includes an operation surface that detects a contact operation, and outputs an operation signal in response to an operation on the operation surface. Various detection methods such as an electrostatic method, a pressure detecting method, and an optical method can be adopted as a method for detecting an operation on the operation surface of the track pad 14.

The up and down keys 15 are used to input an instruction to turn up or down the volume output from a right earphone 32 and a left earphone 34 and input an instruction to increase or decrease the brightness of display of the image display unit 20. The switching switch 16 is a switch for switching an input corresponding to an operation of the up and down keys 15. The power switch 18 is a switch for switching between ON and OFF of a power supply of the HMD 100 and is formed of, for example, a slide switch.

The image display unit 20 is a mounting body mounted on the head of the user, and has an eyeglasses-like shape in the exemplary embodiment. The image display unit 20 includes a right display unit 22, a left display unit 24, a right light-guiding plate 26, and a left light-guiding plate 28 in a main body including a right holding portion 21, a left holding portion 23, and a front frame 27.

The right holding portion 21 and the left holding portion 23 extend from both end portions of the front frame 27 and hold the image display unit 20 on the head of the user like temples (sidepieces) of eyeglasses. Herein, it is assumed that an end portion of both end portions of the front frame 27 located on the right side of the user wearing the image display unit 20 is an end portion ER, and an end portion located on the left side of the user is an end portion EL. The right holding portion 21 extends from the end portion ER of the frame 27 to a position corresponding to a right side of the head of the user wearing the image display unit 20. The left holding portion 23 extends from the end portion EL to a position corresponding to a left side of the head of the user wearing the image display unit 20.

The right light-guiding plate 26 and the left light-guiding plate 28 are provided in the front frame 27. The right light-guiding plate 26 is located in front of a right eye of the user wearing the image display unit 20, and causes the right eye to visually recognize an image. The left light-guiding plate 28 is located in front of a left eye of the user wearing the image display unit 20, and causes the left eye to visually recognize an image.

The front frame 27 has such a shape that one end of the right light-guiding plate 26 and one end of the left light-guiding plate 28 are coupled to each other. This coupled position corresponds to a place between eyebrows of the user wearing the image display unit 20. The front frame 27 may be provided with a nose pad portion contacting the nose of the user wearing the image display unit 20 in the coupled position of the right light-guiding plate 26 and the left light-guiding plate 28. In this case, the nose pad portion, the right holding portion 21, and the left holding portion 23 can hold the image display unit 20 on the head of the user. A belt (not illustrated) contacting the back of the head of the user wearing the image display unit 20 may be coupled to the right holding portion 21 and the left holding portion 23. In this case, the belt can hold the image display unit 20 on the head of the user.

The right display unit 22 achieves display of an image by the right light-guiding plate 26. The right display unit 22 is provided on the right holding portion 21 and located close to the right side of the head of the user wearing the image display unit 20. The left display unit 24 achieves display of an image by the left light-guiding plate 28. The left display unit 24 is provided on the left holding portion 23 and located close to the left side of the head of the user wearing the image display unit 20.

The right light-guiding plate 26 and the left light-guiding plate 28 are optical portions formed by light transmissive resin and the like and are formed of, for example, a prism. The right light-guiding plate 26 and the left light-guiding plate 28 respectively guide image light output from the right display unit 22 and the left display unit 24 to the eyes of the user.

A light control plate (not illustrated) may be provided on the surfaces of the right light-guiding plate 26 and the left light-guiding plate 28. The light control plate is a thin-plate optical element varying in transmittance depending on a wavelength range of light, and functions as a so-called a wavelength filter. The light control plate is, for example, disposed so as to cover a front side of the front frame 27 on a side opposite to a side of the eyes of the user. A light transmittance in an arbitrary wavelength range of visible light, infrared light, ultraviolet light, and the like can be adjusted by appropriately selecting an optical property of this light control plate. An amount of external light being incident on the right light-guiding plate 26 and the left light-guiding plate 28 from the outside and passing through the right light-guiding plate 26 and the left light-guiding plate 28 can be adjusted.

The image display unit 20 is a transmissive display device that causes an external scene to be visually recognized by allowing external light to pass through. The image display unit 20 guides image light generated by the right display unit 22 and the left display unit 24 to the right light-guiding plate 26 and the left light-guiding plate 28, respectively. The image light guided by the right light-guiding plate 26 and the image light guided by the left light-guiding plate 28 are incident on the right eye and the left eye of the user and cause the user to visually recognize a virtual image. In this way, the image display unit 20 displays an image. A region in which the image display unit 20 can display an image in a visual field range FV of the user who wears the image display unit 20 on the head is referred to as a display region.

When external light passes through the right light-guiding plate 26 and the left light-guiding plate 28 from the front of the user and is incident on the eyes of the user, image light forming a virtual image and the external light are incident on the eyes of the user and intensity of the external light thus affects visibility of the virtual image. For this reason, ease of visual recognition of the virtual image can be adjusted by, for example, mounting the light control plate on the front frame 27 and appropriately selecting or adjusting an optical property of the light control plate. For a typical example, the light control plate having light transmissivity to the extent that the user wearing the HMD 100 can visually recognize at least an external scene can be used. Further, effects of protecting the right light-guiding plate 26 and the left light-guiding plate 28 and suppressing damage, adhesion of dirt, and the like to the right light-guiding plate 26 and the left light-guiding plate 28 can be expected from using the light control plate. The light control plate may be detachable from the front frame 27 or each of the right light-guiding plate 26 and the left light-guiding plate 28, and different types of light control plates may be exchangeable and attachable. The image display unit 20 may not include the light control plate.

A camera 60 is disposed on the front frame 27 of the image display unit 20. The camera 60 corresponds to an "imaging unit" of the invention. A configuration and arrangement of the camera 60 are determined such that the camera 60 captures an external scene visually recognized by the user wearing the image display unit 20. The external scene represents a scene outside in a line-of-sight direction of the user wearing the image display unit 20 on the head. For example, the camera 60 is provided in a position of a front surface of the front frame 27 so as not to block external light passing through the right light-guiding plate 26 and the left light-guiding plate 28. In the example illustrated in FIG. 3, the camera 60 is disposed on the end portion ER side of the front frame 27, and functions as a detection unit that detects an object attached as an indicator to a part of the body or the body of the user.

The camera 60 is a digital camera including an imaging element such as a CCD and a CMOS and an imaging lens. In the exemplary embodiment, the camera 60 is a monocular camera, but may be a stereo camera. The camera 60 captures at least a part of an external scene in a direction of the front side of the HMD 100, that is, in a view direction of the user wearing the HMD 100. In other words, the camera 60 captures an image in a range or a direction overlapping a view of the user and captures an image in a direction in which the user fixates. A direction and a size of an angle of view of the camera 60 can be appropriately set. In the exemplary embodiment, as described later, the angle of view of the camera 60 includes the outside world visually recognized by the user through the right light-guiding plate 26 and the left light-guiding plate 28. The angle of view of the camera 60 is more preferably set such that the camera 60 can capture the entire view of the user visually recognizable through the right light-guiding plate 26 and the left light-guiding plate 28.

The camera 60 performs capturing in accordance with control by a capturing control unit 153 (FIG. 7) included in a control unit 150. When the power switch 18 is turned on and a main processor 140 is activated by receiving the power supplied from a power supply unit 130, the main processor 140 causes the power supply unit 130 to start supplying the power to the camera 60 and turns on the camera 60. When the camera 60 turns on, the capturing control unit 153 causes the camera 60 to perform capturing at regular time intervals and generate captured image data. The captured image data is written to a memory 121 (see FIG. 6) and temporarily stored.

The HMD 100 may include a distance sensor (not illustrated) that detects a distance between a measurement target located in a preset measurement direction and the HMD 100. For example, the distance sensor may be disposed on a portion of the front frame 27 where the right light-guiding plate 26 and the left light-guiding plate 28 are coupled to each other. In this case, while the image display unit 20 is mounted, the distance sensor is located almost in the middle of both eyes of the user in a horizontal direction and above both eyes of the user in a perpendicular direction. The measurement direction of the distance sensor may be, for example, a direction of the front side of the front frame 27, that is, a direction overlapping the capturing direction of the camera 60. The distance sensor may include, for example, a light source such as an LED and a laser diode and a light receiving unit that receives reflection light obtained by light emitted from the light source being reflected by a measurement target. The distance sensor may perform triangular distance measuring processing or distance measuring processing based on a time difference in accordance with control by the control unit 150. The distance sensor may include a sound source that generates ultrasonic waves and a detection unit that receives ultrasonic waves reflected by a measurement target. In this case, the distance sensor may perform distance measuring processing based on a time difference until the time when ultrasonic waves are reflected in accordance with control by the control unit 150.

Figure 4:
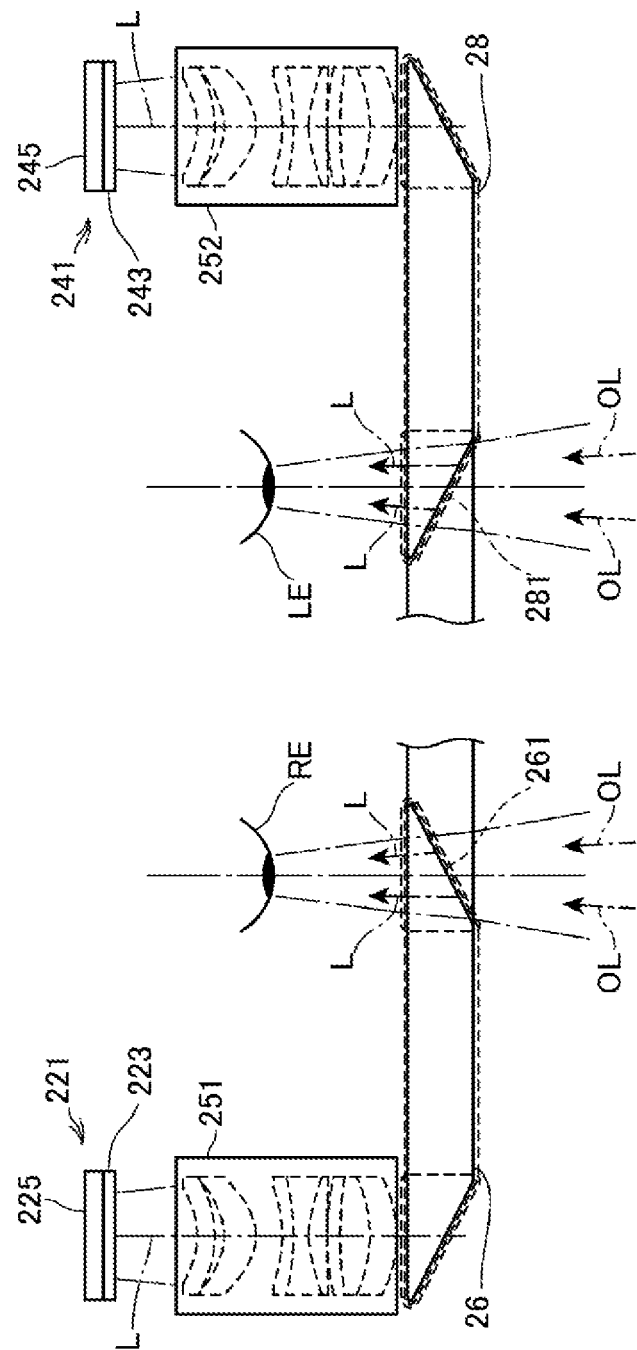
FIG. 4 shows a plan view of a principal part illustrating a configuration of an optical system of the HMD.

FIG. 4 is a plan view of a principal part illustrating a configuration of an optical system provided in the image display unit 20. FIG. 4 illustrates a left eye LE and a right eye RE of the user for description.

As illustrated in FIG. 4, the right display unit 22 and the left display unit 24 are symmetrically formed. The right display unit 22 includes, as a configuration that causes the right eye RE of the user to visually recognize an image, an organic light emitting diode (OLED) unit 221 that emits image light L and a right optical system 251 including a lens group and the like that guide image light L emitted from the OLED unit 221. The image light L is guided to the right light-guiding plate 26 by the right optical system 251.

The OLED unit 221 includes an OLED panel 223 and an OLED driving circuit 225 that drives the OLED panel 223. The OLED panel 223 is a spontaneous light-emitting display panel including light emitting elements arranged in a matrix. The light emitting elements are caused to emit respective color light in red (R), green (G), and blue (B) by organic electro luminescence. The OLED panel 223 includes a plurality of pixels on the assumption that a unit including each one of the R, G, and B elements is one pixel, and generates an image with the pixels arranged in a matrix. The OLED driving circuit 225 selects the light emitting element provided in the OLED panel 223 and energizes the light emitting element in accordance with control by the control unit 150 (FIG. 7), and causes the light emitting element of the OLED panel 223 to emit light. The OLED driving circuit 225 is fixed to a back surface of the OLED panel 223, that is, the back side of a light-emitting surface by bonding and the like. The OLED driving circuit 225 may be formed of, for example, a semiconductor device that drives the OLED panel 223 and installed on a substrate (not illustrated) fixed to the back surface of the OLED panel 223. A temperature sensor 217 is installed on this substrate.

Note that, the OLED panel 223 may include light emitting elements that emit light in white being arranged in a matrix and include color filters corresponding to respective colors of R, G, and B being disposed to overlap each other. The OLED panel 223 having a WRGB configuration including light emitting elements that emit white (W) light in addition to the light emitting elements that each radiate color light of R, G, and B may be used.

The right optical system 251 includes a collimating lens that collimates the image light L emitted from the OLED panel 223. The image light L collimated by the collimating lens is incident on the right light-guiding plate 26. A plurality of reflection surfaces that reflect the image light L are formed in an optical path for guiding light inside the right light-guiding plate 26. The image light L is reflected a plurality of times inside the right light-guiding plate 26 and guided to the right eye RE side. A half mirror 261 (reflection surface) located in front of the right eye RE is formed in the right light-guiding plate 26. The image light L is reflected by the half mirror 261 and emitted from the right light-guiding plate 26 toward the right eye RE. The image light L forms an image on a retina of the right eye RE and causes the user to visually recognize the image.

Further, the left display unit 24 includes, as a configuration that causes the left eye LE of the user to visually recognize an image, an OLED unit 241 that emits image light L and a left optical system 252 including a lens group and the like that guide image light L emitted from the OLED unit 241. The image light L is guided to the left light-guiding plate 28 by the left optical system 252.

The OLED unit 241 includes an OLED panel 243 and an OLED driving circuit 245 that drives the OLED panel 243. The OLED panel 243 is a spontaneous light-emitting display panel formed similarly to the OLED panel 223. The OLED driving circuit 245 selects the light emitting element provided in the OLED panel 243 and energizes the light emitting element in accordance with control by the control unit 150 (FIG. 7), and causes the light emitting element of the OLED panel 243 to emit light. The OLED driving circuit 245 is fixed to a back surface of the OLED panel 243, that is, the back side of a light-emitting surface by bonding and the like. The OLED driving circuit 245 may be formed of, for example, a semiconductor device that drives the OLED panel 243 and installed on a substrate (not illustrated) fixed to the back surface of the OLED panel 243. A temperature sensor 239 is installed on this substrate.

The left optical system 252 includes a collimating lens that collimates the image light L emitted from the OLED panel 243. The image light L collimated by the collimating lens is incident on the left light-guiding plate 28. The left light-guiding plate 28 is an optical element in which a plurality of reflection surfaces that reflect the image light L are formed, and is a prism, for example. The image light L is reflected a plurality of times inside the left light-guiding plate 28 and guided to the left eye LE side. A half mirror 281 (reflection surface) located in front of the left eye LE is formed in the left light-guiding plate 28. The image light L is reflected by the half mirror 281 and emitted from the left light-guiding plate 28 toward the left eye LE. The image light L forms an image on a retina of the left eye LE and causes the user to visually recognize the image.

According to this configuration, the HMD 100 functions as a see-through display device. In other words, the image light L reflected by the half mirror 261 and external light OL passing through the right light-guiding plate 26 are incident on the right eye RE of the user. Also, the image light L reflected by the half mirror 281 and external light OL passing through the left light-guiding plate 28 are incident on the left eye LE of the user. In this way, the HMD 100 causes the image light L of the image processed internally and the external light OL to overlap each other and be incident on the eyes of a user. The user can see an external scene through the right light-guiding plate 26 and the left light-guiding plate 28. The image by the image light L overlapping the external scene or around the external scene is displayed to be visually recognizable. The half mirrors 261 and 281 are image extracting units that reflect image light output from the right display unit 22 and the left display unit 24, respectively, and extract an image, and may be referred to as display units.

Note that, the left optical system 252 and the left light-guiding plate 28 are collectively referred to as a "left light-guiding unit", and the right optical system 251 and the right light-guiding plate 26 are collectively referred to as a "right light-guiding unit". The configurations of the right light-guiding unit and the left light-guiding unit are not limited to the above-described example. An arbitrary method can be used when image light is used to form a virtual image in front of the eyes of the user. For example, a diffraction grating or a semitransparent reflective film may be used.

Referring back to FIG. 3, the control device 10 and the image display unit 20 are connected to each other with a connection cable 40. The connection cable 40 is removably connected to a connector (not illustrated) provided in a lower portion of the case 10A, and connects a tip of the left holding portion 23 and various circuits provided inside the image display unit 20. The connection cable 40 includes a metal cable or an optical fiber cable that transmits digital data, and may include a metal cable that transmits an analog signal. A connector 46 is provided at a mid-point of the connection cable 40. The connector 46 is a jack to which a stereo mini-plug is connected. The connector 46 and the control device 10 are connected to each other with, for example, a line that transmits an analog audio signal. In the configuration example illustrated in FIG. 3, a headset 30 including the right earphone 32 and the left earphone 34 constituting a stereo headphone and a microphone 63 is connected to the connector 46.

The control device 10 and the image display unit 20 may be connected to each other in a wireless manner. For example, the control device 10 and the image display unit 20 may exchange a control signal and data through wireless communication in conformity with standards such as Bluetooth (trade name) and a wireless LAN (including Wi-Fi (trade name)).

As illustrated in FIG. 3, for example, the microphone 63 is disposed such that a sound collecting unit of the microphone 63 is directed in the line-of-sight direction of the user, collects sound, and outputs an audio signal to an audio interface 180 (FIG. 6). The microphone 63 may be, for example, a monaural microphone, or a stereo microphone, may be a directional microphone, and may be a non-directional microphone.

Figure 5:
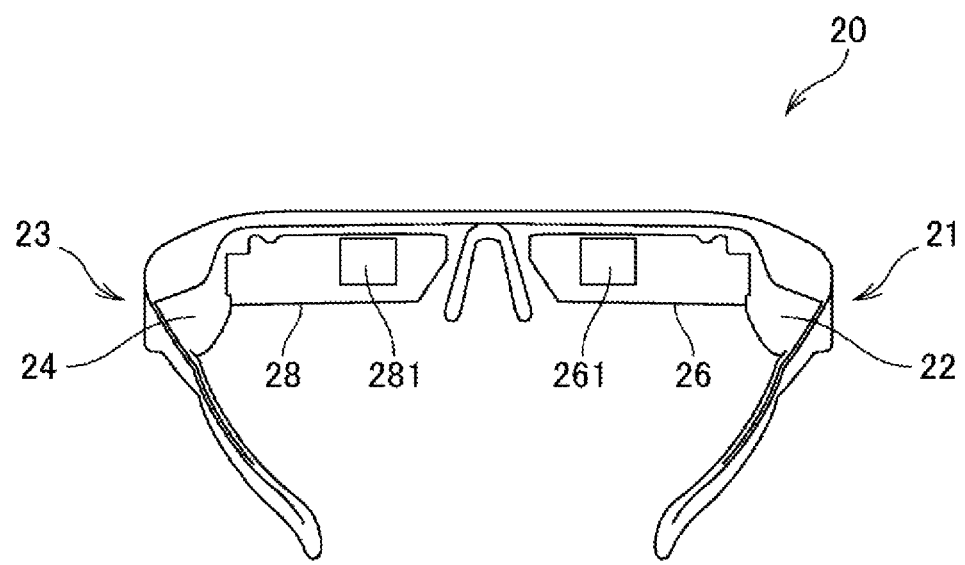
FIG. 5 shows a perspective view illustrating a configuration of an image display unit.

FIG. 5 is a perspective view illustrating a configuration of the image display unit 20, and illustrates a principal configuration of the image display unit 20 seen from a head of the user side. FIG. 5 illustrates a side contacting the head of the user of the image display unit 20, that is, a side seen from the right eye RE and the left eye LE of the user. In other words, the back side of the right light-guiding plate 26 and the left light-guiding plate 28 is seen.

In FIG. 5, the half mirror 261 that irradiates the right eye RE of the user with the image light and the half mirror 281 that irradiates the left eye LE with the image light are each seen as a substantially rectangular region. The entire right light-guiding plate 26 and the entire left light-guiding plate 28 respectively including the half mirrors 261 and 281 allow the external light to pass through as described above. Thus, the user visually recognizes an external scene through the entire right light-guiding plate 26 and the entire left light-guiding plate 28, and visually recognizes a rectangular display image in a position of each of the half mirrors 261 and 281.

The camera 60 is disposed at the end portion on the right side of the image display unit 20, and captures an image in a direction in which both eyes of the user are directed, that is, in the front for the user. An optical axis of the camera 60 is assumed to be in a direction including the line-of-sight direction of the right eye RE and the left eye LE. An external scene visually recognizable by the user wearing the HMD 100 is not necessarily infinitely distant. For example, when the user fixates on a target located in front of the user with both eyes, a distance between the user and the target is often 30 cm to 10 m approximately and more often 1 m to 4 m approximately. Thus, estimates of an upper limit and a lower limit of the distance between the user and the target in normal use of the HMD 100 may be determined. The estimates may be obtained from an investigation or an experiment, or may be set by the user. The optical axis and the angle of view of the camera 60 are preferably set such that a target is included in the angle of view when the distance between the user and the target in normal use corresponds to set estimates of an upper limit and a lower limit.

In general, a visual field angle of a person is approximately 200 degrees in the horizontal direction and approximately 125 degrees in the vertical direction. An effective visual field at the visual field angle having an excellent information receiving capacity is approximately 30 degrees in the horizontal direction and 20 degrees in the vertical direction. Furthermore, it is assumed that a stable field of fixation in which a stable fixation point fixated on by a person is seen quickly is approximately from 60 to 90 degrees in the horizontal direction and from 45 to 70 degrees in the vertical direction. When a fixation point is on a target located in front of the user, the effective visual field in the visual field of the user is approximately 30 degrees in the horizontal direction and 20 degrees in the vertical direction with the line-of-sight direction of each of the right eye RE and the left eye LE at the center. The stable field of fixation is approximately from 60 to 90 degrees in the horizontal direction and from 45 to 70 degrees in the vertical direction. The visual field angle is approximately 200 degrees in the horizontal direction and 125 degrees in the vertical direction. Furthermore, the actual visual field visually recognized by the user through the right light-guiding plate 26 and the left light-guiding plate 28 may be referred to as an actual field of view (FOV). In the configuration of the exemplary embodiment illustrated in FIGS. 3 and 4, the actual field of view corresponds to the actual visual field visually recognized by the user through the right light-guiding plate 26 and the left light-guiding plate 28. The actual field of view is narrower than the visual field angle and the stable field of fixation, but is wider than the effective visual field.

The camera 60 captures an image in a range including an external scene visually recognizable together with an image displayed by the image display unit 20. The angle of view of the camera 60 is preferably set such that the camera 60 can capture an image in a range wider than a visual field of the user. Specifically, the angle of view is preferably set to be wider than at least an effective visual field of the user. The angle of view is also preferably set to be wider than an actual field of view of a user. The angle of view is more preferably set to be wider than a stable field of fixation of the user. It is the most preferable that the angle of view be wider than a visual field angle of both eyes of the user.

The camera 60 may include a so-called wide-angle lens as an imaging lens and be able to capture an image at a wide angle of view. The wide-angle lens may include a lens called a super-wide-angle lens or a semi-wide-angle lens, and may be a single-focus lens or a zoom lens. The camera 60 may include a lens group including a plurality of lenses.

FIG. 6 is a block diagram illustrating a configuration of each of the units constituting the HMD 100.

The control device 10 includes the main processor 140 that executes a program to control the HMD 100. The memory 121 and a nonvolatile storage unit 123 are connected to the main processor 140. A six-axis sensor 111 and a magnetic sensor 113 as types of sensors are connected to the main processor 140. A GPS receiving unit 115, a communication unit 117, an audio codec 182, an external connector 184, an external memory interface 186, a USB connector 188, a sensor hub 192, and an FPGA 194 are connected to the main processor 140. The components function as interfaces to the outside. An LED indicator 12, an LED display unit 17, a vibrator 19, an operation unit 110, and the power supply unit 130 are connected to the main processor 140.

The main processor 140 is installed in a controller substrate 120 built in the control device 10. The memory 121, the nonvolatile storage unit 123, the six-axis sensor 111, the magnetic sensor 113, the GPS receiving unit 115, the communication unit 117, the audio codec 182, and the like in addition to the main processor 140 are further installed in the controller substrate 120. In the exemplary embodiment, the external connector 184, the external memory interface 186, the USB connector 188, the sensor hub 192, the FPGA 194, and an interface 196 are installed in the controller substrate 120.

When the main processor 140 executes a control program, the memory 121 constitutes a work area in which the control program to be executed and data to be processed are temporarily stored. The memory 121 corresponds to an "image storage unit" of the invention. The volatile storage unit 123 is formed of a flash memory and an embedded multi media card (eMMC). The volatile storage unit 123 stores a program executed by the main processor 140 and various data processed by the main processor 140 executing a program.

FIG. 6 illustrates the configuration that achieves the functions of the control device 10 by one main processor 140, but a plurality of processors or semiconductor chips may achieve the functions of the control device 10. For example, a co-processor such as a system-on-a-chip (SoC), a micro control unit (MCU), and a field-programmable gate array (FPGA) may be further installed in the controller substrate 120. The control device 10 may cause both of the main processor 140 and the co-processor to work in cooperation, or may perform various control by selectively using one of the main processor 140 and the co-processor.

The six-axis sensor 111 is a motion sensor (an inertial sensor) including a three-axis acceleration sensor and a three-axis gyro (angular velocity) sensor. An inertial measurement unit (IMU) in which the above-described sensors are modularized may be adopted as the six-axis sensor 111. The magnetic sensor 113 is, for example, a three-axis geomagnetic sensor.

The six-axis sensor 111 and the magnetic sensor 113 each output a detected value to the main processor 140 according to predesignated sampling cycles. The six-axis sensor 111 and the magnetic sensor 113 each output a detected value to the main processor 140 at timings designated by the main processor 140 according to a request from the main processor 140.

The GPS receiving unit 115 includes a GPS antenna, which is not illustrated, and receives a GPS signal sent from a GPS satellite. The GPS receiving unit 115 outputs the received GPS signal to the main processor 140. The GPS receiving unit 115 measures a signal strength of the received GPS signal and outputs the signal strength to the main processor 140. For example, information about received signal strength indication (RSSI), electric field strength, magnetic field strength, and a signal-to-noise ratio (SNR) may be used for the signal intensity.

The communication unit 117 performs wireless communication between an external apparatus and the communication unit 117. The communication unit 117 includes an antenna, an RF circuit, a baseband circuit, a communication control circuit, and the like, or is formed of a device that combines an antenna, an RF circuit, a baseband circuit, a communication control circuit, and the like. The communication unit 117 performs wireless communication in conformity with standards such as Bluetooth and a wireless LAN (including Wi-Fi). The communication unit 117 corresponds to a "first communication unit" of the invention.

The audio interface 180 is an interface that inputs and outputs an audio signal. In the exemplary embodiment, the audio interface 180 includes the connector 46 (FIG. 3) provided on the connection cable 40. The connector 46 is connected to the headset 30. An audio signal output from the audio interface 180 is input to the right earphone 32 and the left earphone 34, and thus the right earphone 32 and the left earphone 34 output sound. The microphone 63 provided in the headset 30 collects sound and outputs an audio signal to the audio interface 180. The audio signal input from the microphone 63 to the audio interface 180 is input to the external connector 184.

The audio codec 182 is connected to the audio interface 180, and encodes and decodes an audio signal input and output through the audio interface 180. The audio codec 182 may include an A/D converter that converts an analog audio signal to digital audio data and a D/A converter that converts digital audio data to an analog audio signal in reverse. For example, the HMD 100 in the exemplary embodiment outputs sound to the right earphone 32 and the left earphone 34 and collects sound with the microphone 63. The audio codec 182 converts digital audio data output from the main processor 140 to an analog audio signal, and outputs the analog audio signal through the audio interface 180. The audio codec 182 converts an analog audio signal input to the audio interface 180 to digital audio data, and outputs the digital audio data to the main processor 140.

The external connector 184 is a connector that connects the main processor 140 and an external device communicating with the main processor 140. The external connector 184 is an interface that connects an external device to the main processor 140 when, for example, the external device is connected to debug a program executed by the main processor 140 and collect logs of operations of the HMD 100.

The external memory interface 186 is an interface to which a portable memory device can be connected, and includes, for example, a memory card slot capable of reading data with a card-type recording medium attached and an interface circuit. A size, a shape, and a specification of the card-type recording medium in this case are not restricted and may be appropriately changed.

The universal serial bus (USB) connector 188 includes a connector and an interface circuit in conformity with USB standards. The USB connector 188 can connect a USB memory device, a smartphone, a computer, and the like. A size, a shape, a version of conformable USB standards of the USB connector 188 may be appropriately selected and changed.

The sensor hub 192 and the FPGA 194 are connected to the image display unit 20 through the interface (I/F) 196. The sensor hub 192 acquires a detected value of various sensors provided in the image display unit 20 and outputs the detected value to the main processor 140. The FPGA 194 performs processing on data transmitted and received between the main processor 140 and each of the units of the image display unit 20 and transmission through the interface 196.

The LED indicator 12 lights up or blinks in accordance with an operating state of the HMD 100. The LED display unit 17 controls turning on and turning off of the LED indicator 12 in accordance with control by the main processor 140. The LED display unit 17 may include an LED (not illustrated) disposed directly below the track pad 14 and a driving circuit that turns on this LED. In this case, the LED display unit 17 causes the LED to turn on, blink, and turn off in accordance with control by the main processor 140.

When captured image data of the camera 60 is stored in a storage unit 160 and uploaded to the server device 5, the LED indicator 12 lights up or blinks, and notifies that the captured image data is stored.

The vibrator 19 includes a motor and an eccentric rotor (none of which are illustrated), and may include another necessary configuration. The vibrator 19 rotates the motor in accordance with control by the main processor 140 to generate vibrations. For example, when an operation on the operation unit 110 is detected, when captured image data of the camera 60 is stored in the storage unit 160, and when captured image data is uploaded the server device 5, the HMD 100 causes the vibrator 19 to generate vibrations in predetermined vibration patterns.

The operation unit 110 includes the operator 13 and the track pad 14. The operator 13 includes the operation button 11, the up and down keys 15, the switching switch 16, and the power switch 18. When the operator 13 and the track pad 14 accept an operation, the operation unit 110 outputs, to the control unit 150, an operation signal including identification information about the operator 13 and the track pad 14 that have accepted the operation and information indicating a content of the accepted operation.

In the exemplary embodiment, any of the keys included in the operator 13 is associated with an operation of a shutter button of the camera 60. When a key of the operator 13 is pressed, the capturing control unit 153 described later causes the camera 60 to perform capturing. In the exemplary embodiment, any of the keys included in the operator 13 is associated with the operation of the shutter button, but an operation of the track pad 14 may be associated with the operation of the shutter button.

The control device 10 includes the power supply unit 130 and operates with power supplied from the power supply unit 130. The power supply unit 130 includes a chargeable battery 132 and a power supply control circuit 134 that controls detection of remaining capacity of the battery 132 and charging of the battery 132. The power supply control circuit 134 is connected to the main processor 140, and outputs a detected value of remaining capacity of the battery 132 or a detected value of voltage to the main processor 140. Power may be supplied from the control device 10 to the image display unit 20 based on power supplied by the power supply unit 130. The main processor 140 may be able to control a state of the power supplied from the power supply unit 130 to each of the units of the control device 10 and the image display unit 20.

The right display unit 22 and the left display unit 24 of the image display unit 20 are each connected to the control device 10. As illustrated in FIG. 3, in the HMD 100, the connection cable 40 is connected to the left holding portion 23, wiring connected to this connection cable 40 is laid inside the image display unit 20, and the right display unit 22 and the left display unit 24 are each connected to the control device 10.

The right display unit 22 includes a display unit substrate 210. An interface (I/F) 211 connected to the interface 196, a reception unit (Rx) 213 that receives data input from the control device 10 through the interface 211, and an EEPROM 215 are installed in the display unit substrate 210.

The interface 211 connects the reception unit 213, the EEPROM 215, the temperature sensor 217, the camera 60, an illumination sensor 65, and an LED indicator 67 to the control device 10.

The electrically erasable programmable read-only memory (EEPROM) 215 stores various data readable by the main processor 140. The EEPROM 215 stores, for example, data about a light-emitting property and a display property of the OLED units 221 and 241 provided in the image display unit 20, data about a property of a sensor provided in the right display unit 22 or the left display unit 24, and the like. Specifically, the EEPROM 215 stores a parameter according to gamma correction of the OLED units 221 and 241, data compensating for a detected value of the temperature sensors 217 and 239, and the like. These data are generated when the HDM 100 is inspected at the time of shipment from a factory and written into the EEPROM 215. After the shipment, the main processor 140 uses the data in the EEPROM 215 to perform processing.

The camera 60 performs capturing in response to a signal input through the interface 211, and outputs captured image data or a signal indicating a capturing result to the control device 10.

As illustrated in FIG. 3, the illumination sensor 65 is provided at the end portion ER of the front frame 27 and disposed so as to receive external light from the front of the user wearing the image display unit 20. The illumination sensor 65 outputs a detected value corresponding to an amount of received light (strength of received light).

As illustrated in FIG. 3, the LED indicator 67 is disposed at the end portion ER of the front frame 27 close to the camera 60. The LED indicator 67 lights up while the camera 60 performs capturing, and notifies that capturing is being performed. When captured image data of the camera 60 is stored in the storage unit 160 and uploaded to the server device 5, the LED indicator 67 lights up or blinks, and notifies that the captured image data is stored.

The temperature sensor 217 detects a temperature and outputs, as a detected value, a voltage value or a resistance value corresponding to the detected temperature. The temperature sensor 217 is installed on the back surface side of the OLED panel 223 (FIG. 4). The temperature sensor 217 may be installed in the same substrate as the OLED driving circuit 225, for example. With this configuration, the temperature sensor 217 detects a temperature of mainly the OLED panel 223.

The reception unit 213 receives data sent from the main processor 140 through the interface 211. When receiving image data about an image displayed on the OLED unit 221, the reception unit 213 outputs the received image data to the OLED driving circuit 225 (FIG. 4).

The left display unit 24 includes a display unit substrate 230. An interface (I/F) 231 connected to the interface 196 and a reception unit (Rx) 233 that receives data input from the control device 10 through the interface 231 are installed in the display unit substrate 230. A six-axis sensor 235 and a magnetic sensor 237 are installed in the display unit substrate 230. The interface 231 connects the reception unit 233, the six-axis sensor 235, the magnetic sensor 237, and the temperature sensor 239 to the control device 10.

The six-axis sensor 235 is a motion sensor (an inertial sensor) including a three-axis acceleration sensor and a three-axis gyro (angular velocity) sensor. An IMU in which the above-described sensors are modularized may be adopted as the six-axis sensor 235. The magnetic sensor 237 is, for example, a three-axis geomagnetic sensor.

The temperature sensor 239 detects a temperature and outputs, as a detected value, a voltage value or a resistance value corresponding to the detected temperature. The temperature sensor 239 is installed on the back surface side of the OLED panel 243 (FIG. 4). The temperature sensor 239 may be installed in the same substrate as the OLED driving circuit 245, for example. With this configuration, the temperature sensor 239 detects a temperature of mainly the OLED panel 243. The temperature sensor 239 may be built in the OLED panel 243 or the OLED driving circuit 245. The substrate may be a semiconductor substrate. Specifically, when the OLED panel 243 serving as a Si-OLED is installed as an integrated circuit on an integrated semiconductor chip together with the OLED driving circuit 245 and the like, the temperature sensor 239 may be installed in this semiconductor chip.

The camera 60, the illumination sensor 65, and temperature sensor 217 provided in the right display unit 22 and the six-axis sensor 235, the magnetic sensor 237, and the temperature sensor 239 provided in the left display unit 24 are connected to the sensor hub 192.

The sensor hub 192 sets and initializes a sampling cycle of each of the sensors in accordance with control by the main processor 140. The sensor hub 192 energizes each of the sensors, sends control data, acquires a detected value, and the like in accordance with a sampling cycle of each of the sensors. The sensor hub 192 also outputs a detected value of each of the sensors provided in the right display unit 22 and the left display unit 24 to the main processor 140 at preset timing. The sensor hub 192 may include a function of temporarily holding a detected value of each of the sensors in accordance with timing of output to the main processor 140. The sensor hub 192 may include a function of converting an output value of each of the sensors to data in unified data format to handle a difference in signal format or data format of the output value and outputting the data to the main processor 140.

The sensor hub 192 starts and stops a current to pass through the LED indicator 67 in accordance with control by the main processor 140, and causes the LED indicator 67 to light up or blink in accordance with timing at which the camera 60 starts and ends capturing.

Figure 7:
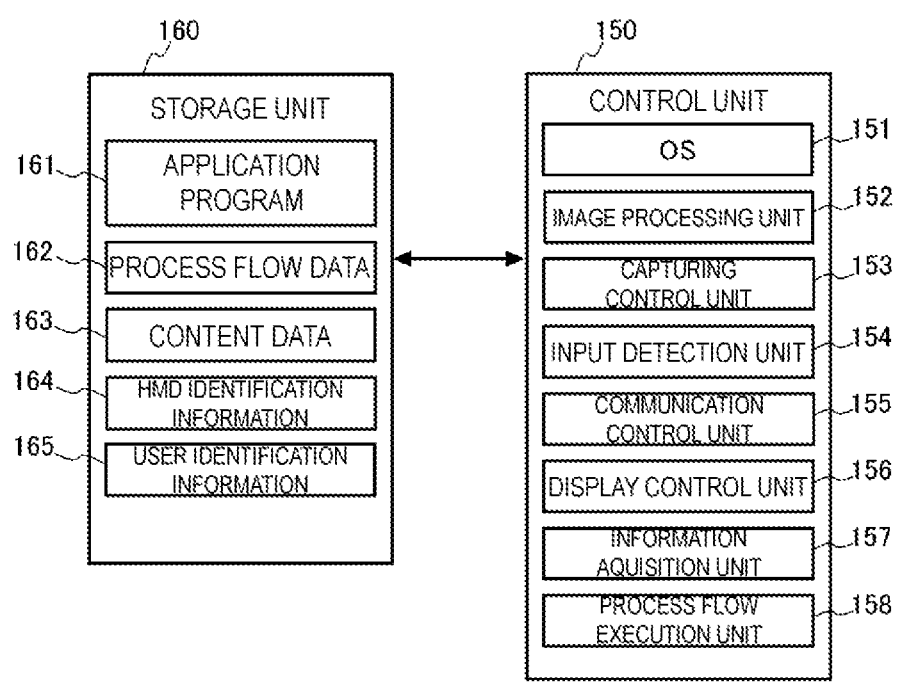
FIG. 7 shows a function block diagram of a control device.

FIG. 7 is a function block diagram of the storage unit 160 and the control unit 150 constituting a control system of the control device 10. The storage unit 160 illustrated in FIG. 7 is a logical storage unit formed of the nonvolatile storage unit 123 (FIG. 6) and the EEPROM 215.

The storage unit 160 stores an application program 161, process flow data 162, content data 163, HMD identification information 164, and user identification information 165.

The application program 161 is an application program including a specific function executed on an OS 151. The application program 161 is a program configured to allow the HMD 100 to execute a process flow created with a PC 300 (see FIG. 12) described later. The application program 161 may be a special application program configured to execute a process flow, or may be a general-purpose program, such as a web browser. A specific configuration of the application program 161 can be selected as desired in conformity with a specification of the process flow data 162.

The process flow data 162 corresponds to "control data" of the invention and is data about a process flow created with the PC 300. The control unit 150 acquires output data 327 (see FIG. 12) created with the PC 200 and causes the storage unit 160 to store the output data 327 as the process flow data 162. The process flow data 162 may be general-purpose data executable by various apparatuses (for example, a device without the camera 60) including the HMD 100 and an HMD 100 with a different type or specification.

Herein, a process flow and the process flow data 162 will be described.

The process flow is a so-called work flow representing a business operation including a plurality of work operations. The process flow is a specific example of an "operation flow" of the invention. The operation flow includes an operation step or a plurality of operation steps, and represents a sequence in which an order of execution of the operation steps is defined. For example, the operation flow represents processing of outputting information about display, inputting information, making a determination, and the like. The operation step is regarded as one unit when creating and editing an operation flow, but otherwise is not particularly restricted. The operation step may include a plurality of operations or processing.

The process flow includes a plurality of work operations performed by an operator to achieve a set object, and includes a process configured to output information to the operator who is engaged with the plurality of work operations. One unit of a work operation performed by an operator and one output of information to the operator each corresponds to a work block in an operation flow. The work block corresponds to an "operation step" of the invention.

Further, the process flow data 162 is data indicating a work process of work operations performed by an operator. The process flow data 162 includes work blocks included in a process flow, an order of execution of the work blocks, and setting contents set to each of the work blocks, and may include other information.

The content data 163 is data about contents including a display image and a video displayed by the image display unit 20 under control of the control unit 150, and includes image data or video data. The content data 163 may include music and audio data.

The HMD identification information 164 is identification information identifying the HMD 100. For example, a MAC address and an IP address of the HMD 100 can be used as the HMD identification information 164.

The user identification information 165 is a user ID and a password that identify a user of the HMD 100 and are set by the user. When a plurality of users share one HMD 100, each of the users needs to be identified. Thus, when using the HMD 100, the user inputs a user ID and a password from the operation unit 110. The control unit 150 performs user authentication with the user ID and the password received from the operation unit 110 and performs log-in processing.

The control unit 150 performs various processing by using data stored in the storage unit 160 and controls the HMD 100. The control unit 150 corresponds to a "control unit" and a "first control unit" of the invention. The control unit 150 includes, as functional blocks, the operating system (OS) 151, an image processing unit 152, the capturing control unit 153, an input detection unit 154, a communication control unit 155, a display control unit 156, an information acquisition unit 157, and a process flow execution unit 158. The functional blocks represent, as blocks, functions achieved by the main processor 140 executing a control program for the sake of convenience, and do not represent a specific application program and hardware.

A function of the OS 151 is a function of a control program stored in the storage unit 160. The other units are functions of an application program executed on the OS 151.

For example, the image processing unit 152 reads the content data 163 from the storage unit 160 and separates a synchronization signal such as a vertical synchronization signal VSync and a horizontal synchronization signal HSync from the read content data 163. The image processing unit 152 generates a clock signal PCLK by using a phase locked loop (PLL) circuit and the like (not illustrated) in accordance with cycles of the separated vertical synchronization signal VSync and horizontal synchronization signal HSync. The image processing unit 152 may perform various image processing such as processing of converting a resolution, adjusting brightness and saturation, and performing 2D/3D conversion on image data included in the content data 163 as necessary.

The image processing unit 152 decompresses every one frame, which is a display unit of an image, of image data subjected to the image processing in a DRAM in the storage unit 160. Hereinafter, a region of the DRAM in which one frame of image data is decompressed is referred to as a frame region. The image processing unit 152 reads image data from the frame region and causes the image display unit 20 to display the read image data.

The image processing unit 152 may be formed of the main processor 140 and other hardware (such as a digital signal processor (DSP)) other than the configuration achieved by the main processor 140 executing a program.

The capturing control unit 153 controls the camera 60. While the power of the HMD 100 is on, the capturing control unit 153 causes the camera 60 to perform capturing at regular time intervals to generate captured image data. The capturing control unit 153 also causes the camera 60 to perform capturing to generate captured image data when the key of the operator 13 associated with the operation of the shutter button is operated. The captured image data captured by the camera 60 is written to the memory 121 and temporarily stored. Since the memory 121 is a volatile memory, the captured image data written to the memory 121 is deleted when the power of the HMD 100 is turned off. The capturing control unit 153 overwrites the memory 121 with captured image data generated at regular time intervals and stores the captured image data. In other words, a region of the memory 121 in which the captured image data has been written is overwritten with newly generated captured image data.

When a predetermined condition is satisfied, the capturing control unit 153 causes the storage unit 160 to store the captured image data written to the memory 121 such that the captured image data is not deleted. The predetermined condition represents a case where the control unit 150 executes the process flow data 162 and a case where use of captured image data is permitted in a work block included in the process flow data 162. In the exemplary embodiment, "use" means that captured image data is permitted to be stored and processing by using the captured image data is permitted during or after execution of the process flow data 162. The capturing control unit 153 causes the storage unit 160 to store captured image data captured during execution of a work block permitted to use the captured image data. The capturing control unit 153 reads captured image data captured during execution of a work block permitted to use the captured image data from the memory 121 and uploads the captured image data to the server device 5.

When executing a work block permitted to use captured image data during execution of the process flow data 162, the capturing control unit 153 may bring the camera 60 into a state of operating by supplying the power to the camera 60. In this case, the capturing control unit 153 causes the camera 60 to perform capturing at regular time intervals and causes the storage unit 160 to store captured image data. The capturing control unit 153 may also cause the camera 60 to perform capturing when the key of the operator 13 associated with the operation of the shutter button is operated.

When the execution of a work block permitted to use captured image data is completed, the capturing control unit 153 brings the camera 60 into a state of stopping operation by stopping to supply the power to the camera 60.

The input detection unit 154 detects an input from an operator based on operation data input from the operation unit 110.

The communication control unit 155 performs data communication with the server device 5 and the other HMD 100 by controlling the communication unit 117.

The display control unit 156 controls and causes the image display unit 20 to display various screens in a display region. For example, when executing the application program 161, the display control unit 156 causes various screens corresponding to work blocks to be displayed.

The information acquisition unit 157 reads data from an external device to which the information acquisition unit 157 is connected through the external connector 184, the external memory interface 186, and the USB connector 188. For example, when a storage device connected to the external memory interface 186 is detected, the information acquisition unit 157 reads data from the storage device, and causes the storage unit 160 to store the data. The HMD 100 can thus read and use the process flow data 162 stored in the storage device.

The process flow execution unit 158 executes the application program 161 stored in the storage unit 160, and executes a process flow in accordance with the process flow data 162. The process flow data 162 includes at least work blocks included in a process flow, an order of execution of the work blocks, and setting contents set to each of the work blocks.

The setting contents set to each of the work blocks include processing performed by the control unit 150. The processing performed by the control unit 150 includes processing of causing a display screen including an image and text to be displayed as information for an operator and reading of a two-dimensional code (2D code) such as a QR code (registered trademark). Further, the processing performed by the control unit 150 includes processing of accepting an input of text and accepting an input of whether a work result is positive or negative. Further, the processing performed by the control unit 150 includes, as work blocks, accepting a selection input using a check box, accepting a selection input using a radio button, and the like.

For example, the work blocks include at least a procedure display block, a read block, an input block, a determination block, a selection input block, and a termination block.

The procedure display block is a block that causes the image display unit 20 to display a screen and text indicating a work procedure in a display region. An operator conducts work while referring to the screen and the text displayed in the display region by the image display unit 20.

The read block is a block that causes the camera 60 to perform capturing and reads a QR code (registered trademark) and a two-dimensional code such as a bar code from captured image data of the camera 60.

For example, the control unit 150 causes a read frame of a two-dimensional code and a guide display that guides an operator to place the two-dimensional code in the read frame to be displayed. When an image of the two-dimensional code is detected from the read frame, the control unit 150 causes the storage unit 160 to store the detected image of the two-dimensional code and analyzes code information included in the two-dimensional code.

The input block is a block that accepts an input from an operator from the operation unit 110 and the like. A method for accepting an input from an operator is not limited to the method using the operation unit 110. For example, text recognition processing using captured image data of the camera 60 and sound recognition processing for sound collected with the microphone 63 may be used to detect various inputs including text. A bar code reader connected with the external connector 184 may be used to read a bar code and to acquire read data. The acquired data may then be accepted as an input from an operator. A motion of an operator acquired from a detected value of the six-axis sensors 235 and 111 may be accepted as an input from an operator.

The determination block is a block that accepts a result of executing work from an operator. For example, the operator conducts work according to a work procedure displayed in the procedure display block, and inputs a work result indicating "positive" or "negative" as a work result from the operation unit 110 and the like. When the control unit 150 accepts an input of "positive" from the operation unit 110, the control unit 150 makes an affirmative determination. In this case, the control unit 150 executes a work block corresponding to the affirmative determination. For example, the control unit 150 executes a procedure display block and causes a screen displaying a next work content to be displayed. When the control unit 150 accepts an input of "negative" from the operation unit 110, the control unit 150 makes a negative determination. In this case, the control unit 150 executes a work block corresponding to the negative determination. For example, the control unit 150 causes the same work content to be displayed again and the same work to be executed again, causes the camera 60 to capture a work result, and the like.

The selection input block is a block that accepts a selection input using a check box and a radio button. When the selection input block is executed, the control unit 150 causes a check box and a radio button to be displayed to be visually recognizable by an operator and accepts an operation of selecting the check box or the radio button. When accepting the selection operation, the control unit 150 executes a work block corresponding to the accepted selection.

The termination block is a block that indicates an end of a process flow.

Each of the work blocks including the procedure display block, the read block, the input block, and the determination block includes permission information set with whether use of captured image data is permitted as a setting content. When the key corresponding to the shutter button of the operation unit 110 is pressed during execution of a work block including the permission information in which permission is set, the control unit 150 causes the storage unit 160 to store captured image data captured by the camera 60. When the key corresponding to the shutter button of the operation unit 110 is pressed during execution of a work block including the permission information in which permission is set, the control unit 150 uploads captured image data captured by the camera 60 to the server device 5.

Switching between storing of captured image data in the storage unit 160 and uploading of the captured image data to the server device 5 may be set as a setting content for each of the work blocks, or may be set by each operator. In other words, setting information in which whether uploading of captured image to the server device 5 or storing of the captured image data in the storage unit 160 is set may be associated with user information and stored in the storage unit 160.

When a work block during execution is a block that does not include the permission information, or when rejection is set in the permission information, the control unit 150 does not cause the storage unit 160 to store captured image data captured by the camera 60. Similarly, when a work block during execution does not include the permission information, or when rejection is set in the permission information, the control unit 150 does not upload captured image data captured by the camera 60 to the server device 5.

Figure 8:
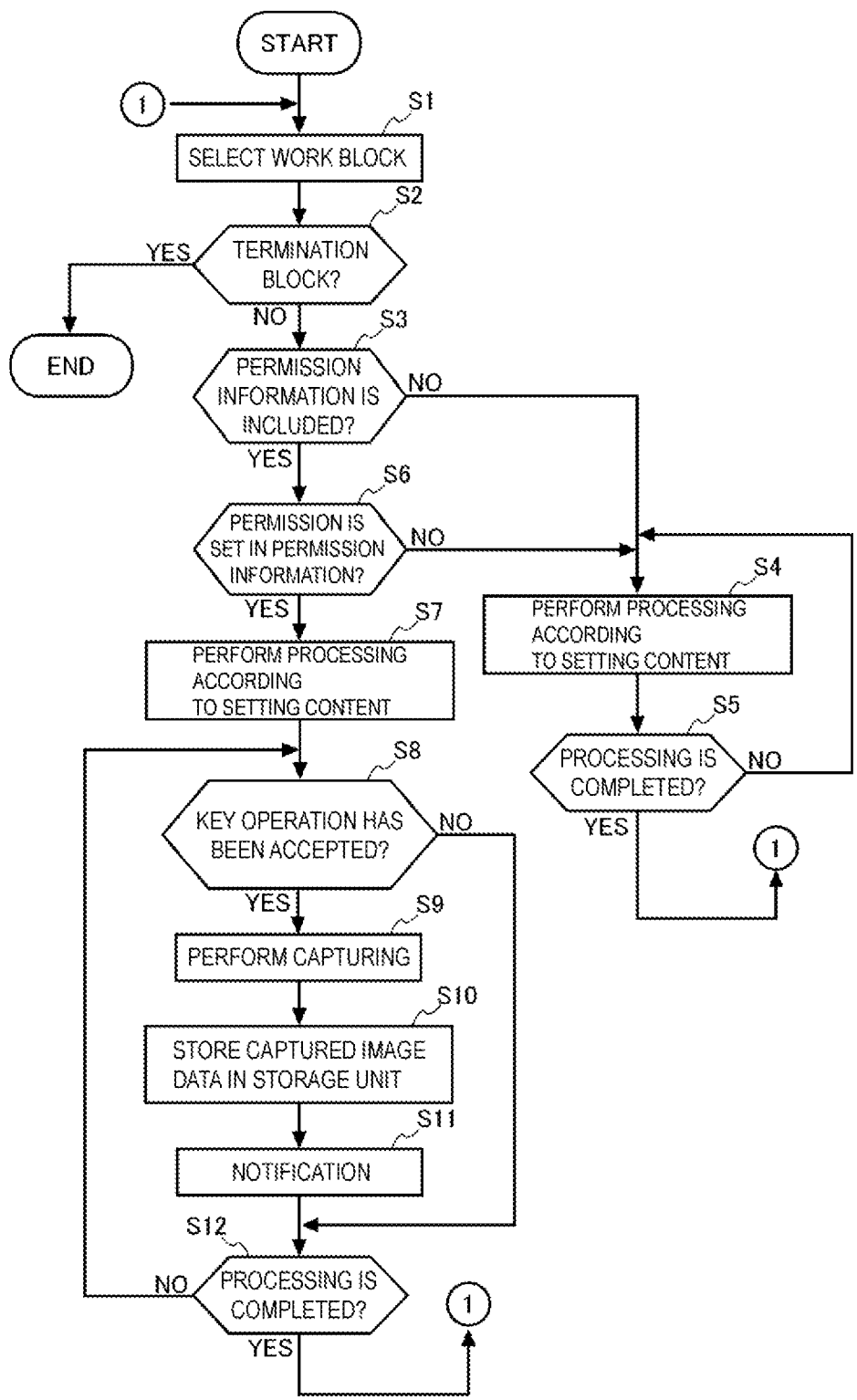
FIG. 8 shows a flowchart illustrating a first operation of the HMD.

FIG. 8 is a flowchart illustrating a first operation of the control unit 150. The first operation is an operation of the control unit 150 to cause the storage unit 160 to store captured image data when a work block including permission information in which permission is set is executed.

The control unit 150 reads the process flow data 162 from the storage unit 160, and executes a work block included in the process flow data 162. Specifically, the control unit 150 selects a work block executed according to an order of execution included in the process flow data 162 (Step S1). Next, the control unit 150 determines whether the selected work block is a termination block (Step S2). When the selected work block is the termination block (YES in Step S2), the control unit 150 ends this processing flow. When the selected work block is not the termination block (NO in Step S2), the control unit 150 determines whether permission information is included in the selected work block (Step S3).

When the permission information is not included in the selected work block (NO in Step S3), the control unit 150 performs processing according to a setting content of the work block (Step S4). Examples of the processing performed by the control unit 150 include processing of causing the image display unit 20 to display a screen and text indicating a work content and a work procedure to be performed by an operator, processing of causing the camera 60 to perform capturing and reading a two-dimensional code, and the like.

The control unit 150 performs the processing according to the setting content and then determines whether the processing set to the setting content of the selected work block is completed (Step S5). For example, when the processing set to the setting content of the selected work block is processing of reading a two-dimensional code, the control unit 150 determines whether an image of the two-dimensional code has been acquired from captured image data of the camera 60. When the image of the two-dimensional code has been able to be acquired, the control unit 150 determines that the processing set to the setting content of the work block is completed.

When the processing set to the setting content of the work block is not completed (NO in Step S5), the processing returns to Step S4 and the control unit 150 continues the processing according to the setting content. When the processing set to the setting content of the work block is completed (YES in Step S5), the processing returns to Step S1 and the control unit 150 selects a next work block (Step S1).

When the control unit 150 determines that the permission information is included in Step S3 (YES in Step S3), the control unit 150 determines whether "permission" is set in the permission information (Step S6). When "permission" is not set in the permission information, that is, when "rejection" is set (NO in Step S6), the processing proceeds to Step S4 and the control unit 150 performs the processing according to the setting content of the work block. Subsequently, the control unit 150 determines whether the processing set in the work block is completed in Step S5.

When "permission" is set in the permission information (YES in Step S6), the control unit 150 performs the processing according to the setting content set in the work block (Step S7). The control unit 150 determines whether an operation on the key corresponding to the shutter button has been accepted during execution of the processing (Step S8). When the operation on the key corresponding to the shutter button has not been accepted (NO in Step S8), the control unit 150 determines whether the processing set to the setting content of the work block is completed (Step S12). When the processing set to the setting content of the work block is not completed (NO in Step S12), the processing returns to Step S8, and the control unit 150 determines whether the operation on the key corresponding to the shutter button has been accepted during execution of the processing (Step S8). When the processing set to the setting content of the work block is completed (YES in Step S12), the processing returns to Step S1 and the control unit 150 selects a next work block (Step S1).

When the operation on the key corresponding to the shutter button has been accepted (YES in Step S8), the control unit 150 causes the camera 60 to perform capturing (Step S9) and causes the storage unit 160 to store captured image data being captured (Step S10). The control unit 150 makes notification when causing the storage unit 160 to store the captured image data (Step S11). In the exemplary embodiment, the control unit 150 causes at least one of the LED indicators 12 and 67 to light up or blink as the notification. In addition, the control unit 150 may make the notification by causing the earphones 32 and 34 to output preset sound, or by causing the vibrator 19 to vibrate in predetermined vibration patterns. The LED indicators 12 and 67, the earphones 32 and 34, and the vibrator 19 correspond to "notification units" of the invention.

The control unit 150 makes the notification and causes the storage unit 160 to store the captured image data, and then determines whether the processing set to the setting content of the work block is completed (Step S12). When the processing set to the setting content of the work block is not completed (NO in Step S12), the processing returns to Step S8, and the control unit 150 determines whether the operation on the key corresponding to the shutter button has been accepted during execution of the processing (Step S8). When the processing set to the setting content of the work block is completed (YES in Step S12), the processing returns to Step S1 and the control unit 150 selects a next work block (Step S1).

Figure 9:
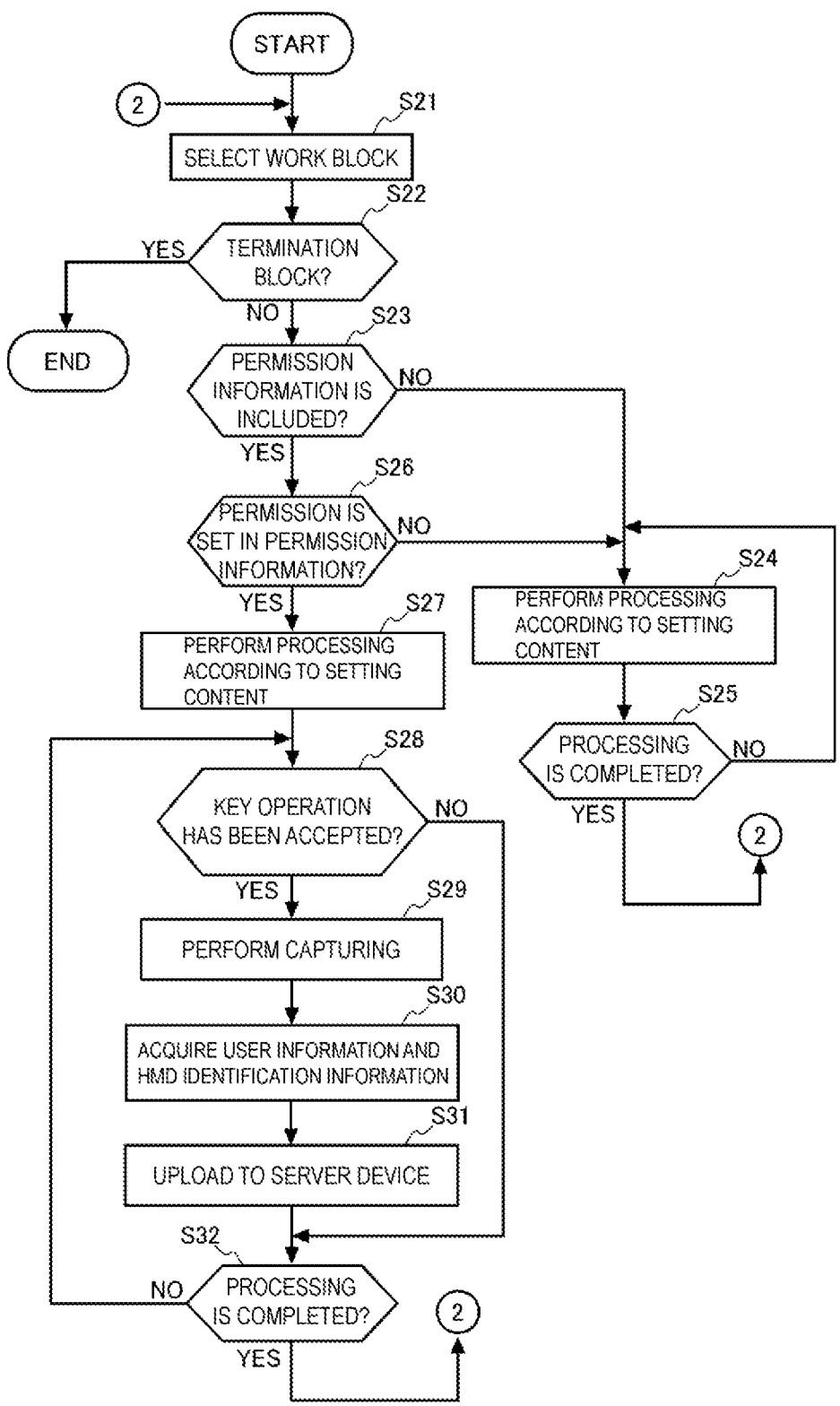
FIG. 9 shows a flowchart illustrating a second operation of the HMD.

FIG. 9 is a flowchart illustrating a second operation of the control unit 150. The second operation is an operation to upload captured image data to the server device 5 when a work block including permission information in which permission is set is executed. Note that, in FIG. 9, operations in Steps S21 to S27 are the same as the first operation described with reference to FIG. 8, and thus description will be omitted.

When "permission" is set in the permission information (YES in Step S26), the control unit 150 performs the processing according to the setting content set in the work block (Step S27). The control unit 150 determines whether an operation on the key corresponding to the shutter button has been accepted during execution of the processing (Step S28). When the operation on the key corresponding to the shutter button has not been accepted (NO in Step S28), the processing proceeds to Step S32, and the control unit 150 determines whether the processing set to the setting content of the work block is completed (Step S32). When the processing is completed (YES in Step S32), the processing proceeds to Step S21 and the control unit 150 selects a work block.

When the operation on the key corresponding to the shutter button has been accepted (YES in Step S28), the control unit 150 causes the camera 60 to perform capturing (Step S29), and writes captured image data being captured to the memory 12 and causes the memory 12 to temporarily store the captured image data. The control unit 150 generates image identification information identifying captured image data, and associates the generated image identification information with the captured image data. For example, a serial number and the like associated with each captured image data uploaded to the server device 5 by the HMD 100 is used as the image identification information.

Next, the control unit 150 acquires operator information about an operator in a logged-in state and HMD identification information from the storage unit 160 (Step S30). The operator information acquired from the storage unit 160 may be at least one of a user ID and a password. Next, the control unit 150 adds the image identification information, the operator information, and the HMD identification information to the captured image data temporarily stored in the memory 121 and uploads the captured image data to the server device 5 (Step S31). Operator information, a user ID, and a password correspond to "limited information" of the invention. Further, HMD identification information corresponds to "first identification information" of the invention.

Timing at which captured image data of the camera 60 is uploaded to the server device 5 is not limited to only timing at which the camera 60 performs capturing to generate captured image data. For example, captured image data may be uploaded to the server device 5 when processing set to a setting content of a work block is completed and before a next work block to be executed is selected in Step S21, or after execution of the process flow data 162. Further, captured image data may also be uploaded to the server device 5 in a shutdown sequence after the power of the HMD 100 is turned off.

The control unit 150 uploads the captured image data to the server device 5, and then determines whether the processing set to the setting content of the work block is completed (Step S32). When the processing set to the setting content of the work block is not completed (NO in Step S32), the processing returns to Step S28, and the control unit 150 determines whether the operation on the key corresponding to the shutter button has been accepted during execution of the processing (Step S28). When the processing set to the setting content of the work block is completed (YES in Step S32), the processing returns to Step S21 and the control unit 150 selects a next work block (Step S21).

Figure 10:
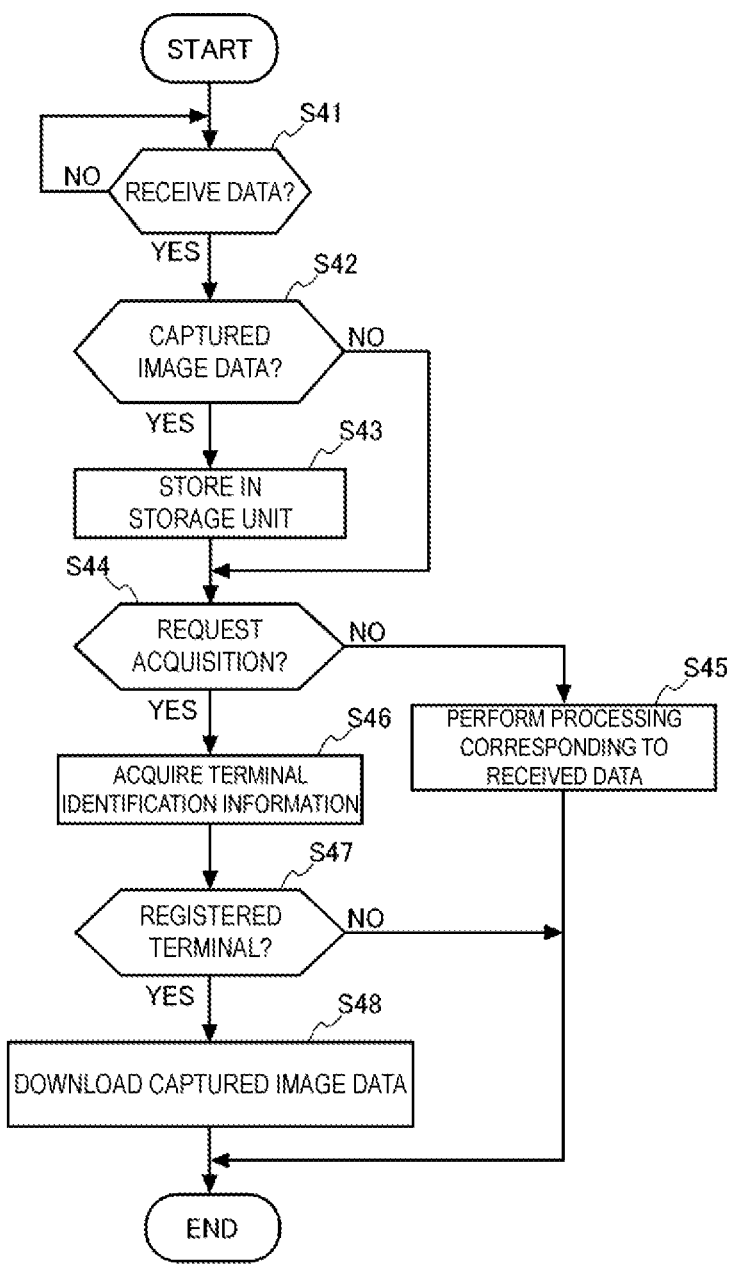
FIG. 10 shows a flowchart illustrating an operation of a server device.

FIG. 10 is a flowchart illustrating an operation of the server device 5.

When the communication unit 51 receives data through the communication network 7 (YES in Step S41), the control unit 55 identifies the received data. First, the control unit 55 determines whether captured image data sent from the HMD 100 is included in the received data (Step S42).

When the captured image data is included in the received data (YES in Step S42), the control unit 55 extracts image identification information, operator information, and HMD identification information from the received data. The control unit 55 registers the extracted information in a cell in which the corresponding HMD identification information of the information management table 57 is registered. The control unit 55 also associates the received captured image data with the image identification information and stores the data in the storage unit 53 (Step S43).

When the data received through the communication network 7 is not captured image data (NO in Step S42), the control unit 55 determines whether the received data is a request for acquiring the captured image data (Step S44). When the received data is not a request for acquiring the captured image data (NO in Step S44), the control unit 55 performs processing corresponding to the received data (Step S45). When the received data is a request for acquiring the captured image data (YES in Step S44), the control unit 55 acquires terminal identification information from the terminal device that has received the data in Step S41 or from the data received in Step S41 (Step S46). The control unit 55 determines whether the acquired terminal identification information is registered in the information management table 57 (Step S47).

When the acquired terminal identification information is not registered in the information management table 57 (NO in Step S47), the control unit 55 ends the processing flow without downloading the captured image data to the terminal device that has received the data.

When the acquired terminal identification information is identification information registered in the information management table 57 (YES in Step S47), the control unit 55 causes the terminal device to display a list of downloadable captured image data. For example, the control unit 55 generates a thumbnail image and causes the terminal device to display the thumbnail image. The captured image data is captured image data about image identification information associated with the acquired terminal identification information and registered in the information management table 57. When the control unit 55 accepts an input of selecting captured image data from the terminal device, the control unit 55 downloads the selected captured image data to the terminal device (Step S48).

Figure 11:
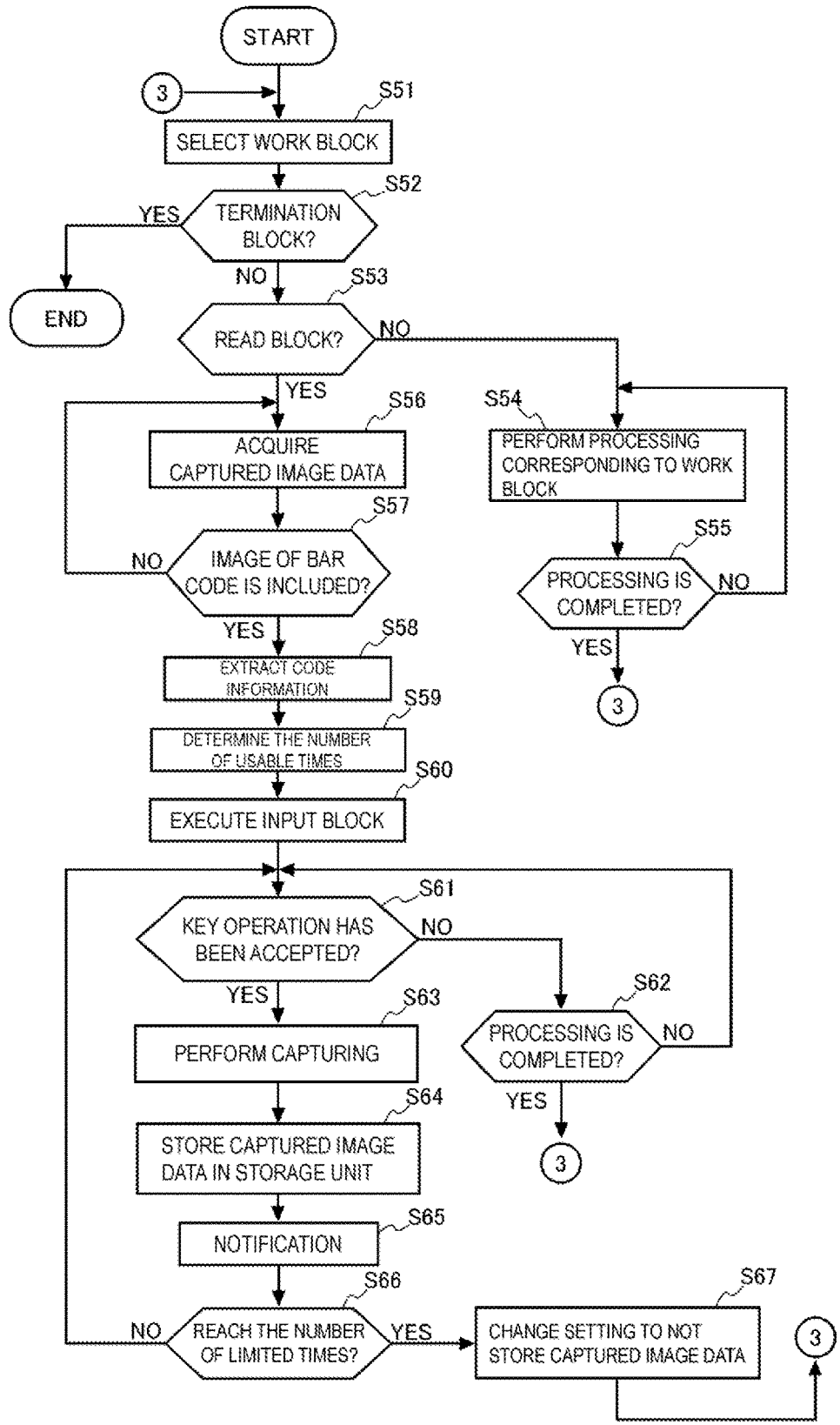
FIG. 11 shows a flowchart illustrating a third operation of the HMD.

Next, a third operation of the control unit 150 will be described with reference to a flowchart illustrated in FIG. 11. The third operation is an operation to acquire captured image data in which a bar code is captured from captured image data of the camera 60 and permit storing of the captured image data in the storage unit 160 for a number of times set in the bar code. Operations in Steps S51 and S52 illustrated in FIG. 11 are the same as those in Steps S1 and S2 illustrated in FIG. 8, and thus description will be omitted.

The control unit 150 determines whether a selected work block is a read block (Step S53). When the selected work block is not the read block (NO in Step S53), the control unit 150 performs processing according to the selected work block (Step S54). Operations in Steps S54 and S55 are the same as those in Steps S4 and S5 illustrated in FIG. 8, and thus description will be omitted.

When the selection block is the read block (YES in Step S53), the control unit 150 acquires captured image data from the memory 121 (Step S56). The control unit 150 causes the camera 60 to perform capturing at regular time intervals, and writes the generated captured image data to the memory 121 and causes the memory 121 to temporarily store the captured image data.

The control unit 150 analyzes the acquired captured image data, and determines whether an image of a bar code is included in the captured image data (Step S57). When the image of the bar code is not included (NO in Step S57), the processing returns to Step S56, and the control unit 150 acquires next captured image data from the memory 121 and determines whether an image of a bar code is included.

When the image of the bar code is included (YES in Step S57), the control unit 150 extracts code information from the image of the bar code (Step S58), and causes the storage unit 160 or the memory 121 to store the extracted code information. The control unit 150 analyzes the extracted code information and determines a number of usable times (Step S59). The number of usable times stipulates an upper limit of the number of times captured image data is permitted to be stored in the storage unit 160. The control unit 150 permits use of captured image data in a work block during execution with the number of usable times as an upper limit. In a case where the camera 60 is caused to perform capturing only when an operation of the key corresponding to the shutter button is accepted, the number of usable times stipulates an upper limit of the number of times capturing by the camera 60 is permitted. The number of usable times can be set as code information about a bar code and can be set previously for each user identification information and each work block.

When the number of usable times cannot be determined with acquired code information, that is, when an image of a bar code is an image of a bar code unidentifiable by the HMD 100, the control unit 150 may cause the image display unit 20 to display an error. After the control unit 150 causes the image display unit 20 to display an error, the processing then proceeds to Step S56, and the control unit 150 acquires captured image data from the memory 121 and extracts code information.

The control unit 150 determines the number of usable times, and then executes an input block that accepts an input from an operator from the operation unit 110 and the like according to the process flow data 162 (Step S60). When the input block is executed, the control unit 150 determines whether the operation on the key corresponding to the shutter button has been accepted (Step S61). When the operation on the key corresponding to the shutter button has not been accepted (NO in Step S61), the control unit 150 determines whether the processing is completed (Step S62). The determination in Step S62 may be determination of whether an operation indicating completion of the processing has been accepted from the operation unit 110, or determination of whether captured image data corresponding to the number of usable times is stored in the storage unit 160. When the control unit 150 determines that the processing is not completed (NO in Step S62), the processing returns to Step S61, and the control unit 150 determines whether the operation on the key corresponding to the shutter button has been accepted. When the control unit 150 determines that the processing is completed (YES in Step S62), the processing returns to Step S51 and the control unit 150 selects a work block.

When the operation on the key corresponding to the shutter button has been accepted (YES in Step S61), the control unit 150 causes the camera 60 to perform capturing (Step S63) and causes the storage unit 160 to store captured image data being captured (Step S64). The control unit 150 makes notification when causing the storage unit 160 to store the captured image data (Step S65).

Next, the control unit 150 determines whether the number of times captured image data stored in the storage unit 160 reaches the number of usable times (Step S66). When the number of usable times is not reached (NO in Step S66), the processing returns to Step S61, and the control unit 150 determines whether the operation on the key corresponding to the shutter button has been accepted. When the number of usable times is reached (YES in Step S66), the control unit 150 changes a setting to not store captured image data in the storage unit 160 (Step S67), the processing returns to Step S51, and the control unit 150 then selects a work block. At this time, the control unit 150 may cause the image display unit 20 to display that the number of usable times is reached.

As described above, the HMD 100 in the exemplary embodiment includes the storage unit 160, the camera 60, and the control unit 150.

The storage unit 160 stores the process flow data 162 that defines a process flow including a plurality of work blocks in which an order of execution is predetermined. The camera 60 captures an external scene. The control unit 150 executes a process flow according to the process flow data 162. At least any one of the work blocks included in the process flow data 162 includes permission information set with whether use of captured image data of the camera 60 is permitted. When executing a process flow, the control unit 150 controls propriety of using the captured image data in each of the work blocks according to a setting of the process flow data 162 about the work block.

When the capturing function of the camera 60 is controlled by the OS, whether the camera 60 is operated can only be set uniformly, and a program of the OS cannot be rewritten. As a result, this causes convenience to decrease.

In the exemplary embodiment, capturing of the camera 60 is controlled by the process flow data 162 being an application program including a specific function executed on the OS 151. When the process flow data 162 is executed, propriety of using captured image data is controlled for each work block included in a process flow. Therefore, the propriety of using captured image data can be controlled for each work block, and securing of security is compatible with improvement in user convenience.

When executing a work block, the control unit 150 controls the camera 60 between a state of being operated and a state of being stopped according to the setting of the process flow data 162 about the work block.

Therefore, the camera 60 can be switched between the state of being operated and the state of being stopped for each work block by causing the control unit 150 to execute the process flow data 162.

The HMD 100 further includes the memory 121 that stores captured image data of the camera 60. When executing a work block, the control unit 150 controls whether to use captured image data of the camera 60 stored in the memory 121 according to the setting of the process flow data 162 about the work block.

Therefore, propriety of using the captured image data stored in the memory 121 can be controlled according to the setting of the process flow data 162.

When executing a work block including processing of capturing an image including code information, the control unit 150 controls use of captured image data of the camera 60. When controlling the use of the captured image data of the camera 60, the control unit 150 extracts the code information from the captured image data of the camera 60 and causes the storage unit 160 to store the code information.

Therefore, when executing a work block that captures an image including code information, the code information can be extracted from captured image data and processing corresponding to the extracted code information can be performed.

When executing the work block including the processing of capturing an image including code information, the control unit 150 determines the number of usable times of the captured image data based on the code information extracted from the captured image data. The control unit 150 allows the captured image data to be used in another work block included in a process flow with the number of usable times as an upper limit.

According to this configuration, an upper limit of the number of usable times of captured image data can be set.

When executing a work block in which captured image data is set to be usable, the control unit 150 allows use of captured image data corresponding to capturing by the camera 60 for a plurality of times.

Therefore, capturing for a plurality of times can be performed in the work block in which the captured image data is set to be usable.

The HMD 100 includes the LED indicators 12 and 67 as notification units.

The control unit 150 makes notification when causing the storage unit 160 to store the captured image data of the camera 60 stored in the memory 121.

Therefore, the notification that the captured image data is stored in the storage unit 160 can be made.

When use of the captured image data is permitted, the control 150 of the HMD 100 sends the captured image data captured by the camera 60 from the communication unit 117 to the server device 5.

Therefore, when the use of the captured image data is permitted, the captured image data is sent to the server device 5. Therefore, a leak of the captured image data to the outside can be prevented.

The control unit 150 adds a password as limited information limiting use of the captured image data to the captured image data and sends the captured image data to the server device 5.

Therefore, the captured image data can be prevented from being visually recognized by a third party, and a leak of information can be more efficiently prevented.

The control unit 150 also adds HMD identification information identifying the HMD 100 to the captured image data and sends the captured image data to the server device 5.

Therefore, the HMD 100 that generates the captured image data can be identified in the server device 5, and the captured image data can be prevented from being sent to an external device.

The server device 5 includes the communication unit 51, the storage unit 53, and the control unit 55.

The storage unit 53 associates the captured image data received from the HMD 100 with the HMD identification information, and stores the data. The storage unit 53 also associates terminal identification information identifying a terminal device in which the captured image data is usable with HMD identification information of the HMD 100 from which the terminal device corresponding to the terminal identification information is allowed to acquire captured image data, and stores the information.

When receiving the terminal identification information from the communication unit 51, the control unit 55 determines whether the terminal identification information coinciding with the received terminal identification information is stored in the storage unit 53.

When the identical terminal identification information is stored in the storage unit 53, the control unit 55 sends the captured image data in the HMD identification information associated with the identical terminal identification information to the terminal device associated with the terminal identification information.

Therefore, the captured image data can be prevented from being sent to an external device.

Next, an editing device that creates and edits the process flow data 162 will be described.

Figure 12:
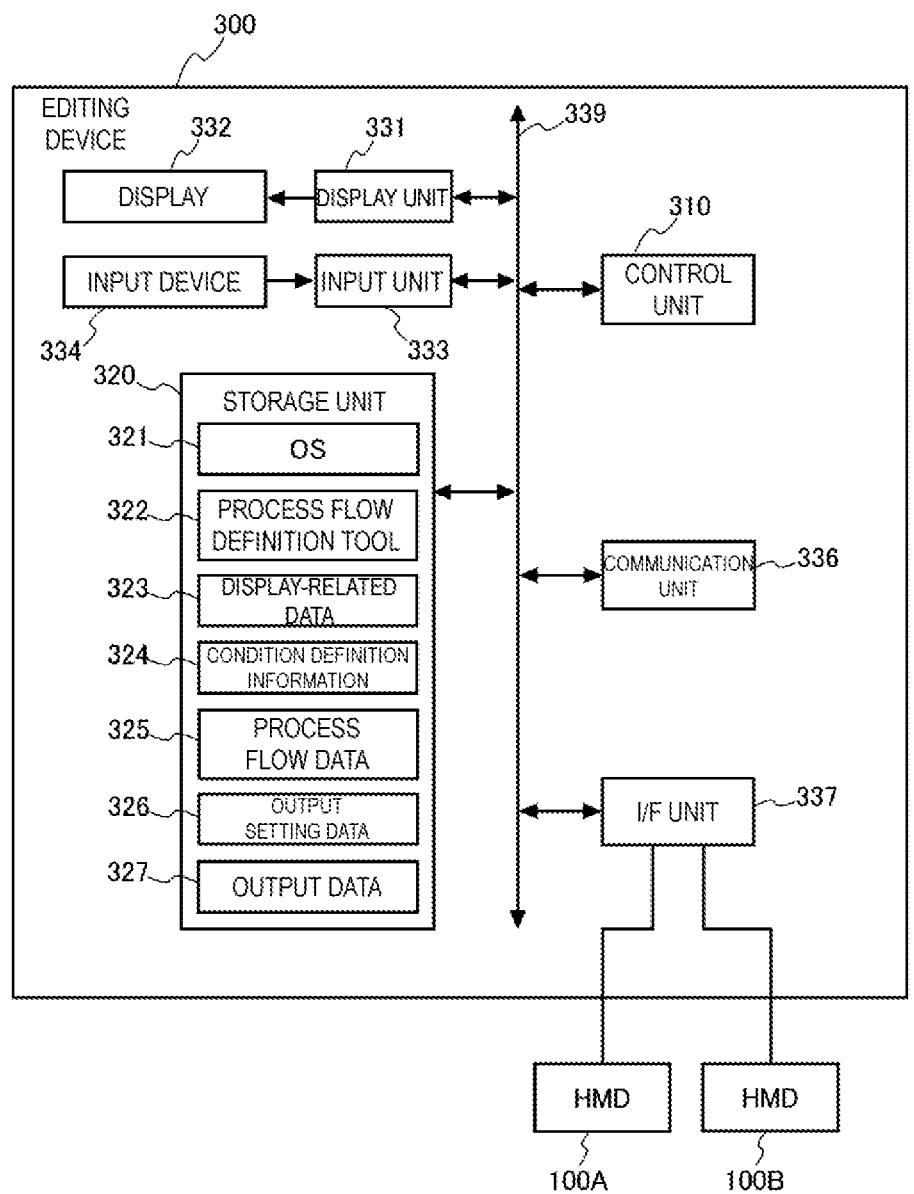
FIG. 12 shows a block diagram of a PC.

FIG. 12 is a function block diagram of a personal computer (PC) 300 operating as an editing device. The PC 300 includes a display 332 and an input device 334. As long as the PC 300 is a computer operable by a user, a specific configuration is not limited. For example, the PC 300 may be a desktop computer, and may be a portable computer, such as a laptop computer and a tablet computer. As long as the PC 300 includes functions illustrated in FIG. 12, the PC 300 may be a small device, such as a smartphone.

The PC 300 includes a control unit 310, a storage unit 320, a display unit 331, an input unit 333, a communication unit 336, and an interface (I/F) unit 337, and these are connected to each other via a bus 339. The interface unit 337 corresponds to a "connection unit" of the invention.

The control unit 310 includes a processor, such as a CPU, and is configured to allow the processor to execute a program to control the PC 300, and to achieve various functions of the PC 300. The control unit 310 may include a RAM configured to prepare a work area for the processor. The control unit 310 may include a ROM configured to store in a non-volatile manner a basic control program executed by the processor.

The storage unit 320 includes a magnetic storage medium, an optical storage medium, a semiconductor storage device, or the like, and has a storage region used to store programs and data. The storage unit 320 is configured to store in a non-volatile manner programs to be executed by the control unit 310 and data to be processed by the control unit 310. Programs and data stored in the storage unit 320 will be described later.

The display unit 331 is connected to the display 332, and is configured to cause the display 332 to display various screens with text and/or images in accordance with control by the controller 310. The display 332 corresponds to a "display face" of the invention.

The display 332 includes a liquid crystal display device, an organic electro luminescence (EL) display device, or another display device, and is driven by the display unit 331.

The input unit 333 is connected to the input device 334, and is configured to detect an operation of the input device 334, and to accept an input through the operation of the input device 334. The input unit 333 outputs, to the control unit 310, data indicating a content of the input through the input device 334.

The input device 334 may be a text input device, such as a keyboard, or a pointing device, such as a mouse, a digitizer, and a pen tablet. The input device 334 may be a configuration integrated with the display 332, such as a touch panel. The input device 334 may be a software keyboard or a graphical user interface (GUI) incorporated into a screen displayed on the display 332.

The interface (I/F) unit 337 is an interface used to connect an external device to the PC 300, and includes a universal serial bus (USB) interface, for example. The interface 337 includes a plurality of connectors and interface circuits (none of which are illustrated) that connect cables, and can connect a plurality of HMDs 100 at the same time. The interface unit 337 exchanges data with the external device connected to the interface unit 337 in accordance with control by the control unit 310.

The communication unit 336 is configured to execute wired or wireless communications with the external device attached to the PC 300 in accordance with control by the control unit 310. The communication unit 336 executes communications in accordance with various protocols, such as an Ethernet (registered trademark) protocol, a wireless LAN (including WiFi (registered trademark)), and a Bluetooth (registered trademark).

As examples of programs and data to be stored in the storage unit 320, FIG. 12 illustrates an operating system (OS) 321, a process flow definition tool 322, display-related data 323, condition definition information 324, process flow data 325, output setting data 326, and output data 327. The OS 321 is a control program used by the control unit 310 to control the PC 300, and configures a platform allowing the control unit 310 to operate an application program. When the control unit 310 executes the OS 321, a basic function of the PC 300 is provided as an application program interface (API) for the application program to be executed by the control unit 310. The basic function of the PC 300 includes display processing to be executed by the display unit 331, input detection processing to be executed by the input unit 333, data input and output processing to be executed by the interface unit 337, communication processing to be executed by the communication unit 336, and other processing, for example.

The process flow definition tool 322 is an application program used to create and edit a process flow with the PC 300. When the control unit 310 executes the process flow definition tool 322, an operation flow to be executed by the HMD 100 can be created and edited. A process flow created by the process flow definition tool 322 is a specific example of an operation flow.

The display-related data 323 includes data about images and/or text to be displayed by the display unit 331 when the control unit 310 executes the process flow definition tool 322. When the control unit 310 executes the process flow definition tool 322, the control unit 310 refers to the display-related data 323, and causes the display 332, via the display unit 331, to display an image and/or text based on the display-related data 323.

The condition definition information 324 is information defining conditions with respect to work blocks included in a process flow, and includes information about some or all of work blocks to be created or edited by executing the process flow definition tool 322. A condition with respect to a work block represents a condition to be set with respect to a content of the work block. For example, a work block corresponding to an input of information needs to be set with a format of information to be input, an input method, and an action when no input is made, for example. The condition definition information 324 is set with how to define, as a condition for a work block corresponding to an input of information, a format of information to be input, an input method, and an action when no input is made.

The process flow data 325 is data about a process flow generated when the control unit 310 has executed the process flow definition tool 322. The process flow data 325 includes work blocks included in the process flow, an order of execution of the work blocks, and setting contents including inputs with respect to the work blocks, and may include other information. The process flow data 325 has a data format that can be interpreted when the control unit 310 executes the process flow definition tool 322. When the control unit 310 executes the process flow definition tool 322, the control unit 310 can read the process flow data 325 from the storage unit 320, and can edit a process flow represented by the read process flow data 325. In this case, based on the edited process flow, the control unit 310 can update the process flow data 325 stored in the storage unit 320.

The output setting data 326 is data relating to a setting when the process flow data 325 is converted to the output data 327. The output data 327 is, in the HMD 100 or a device other than the HMD 100, data used to execute a process flow by following the process flow data 325, and differs in data format and the like from the process flow data 325.

The output data 327 is data interpretable and executable by the HMD 100, and is described in a general-purpose data format, for example. A general-purpose data format represents a data format that can be processed by the HMD 100 via a web browser, for example. Specifically, general-purpose data is data described in Extensible Markup Language (XML), Hypertext Markup Language (HTML), and the like.

The output data 327 may be general-purpose data used to execute a process flow in various devices including general-purpose devices, such as PCs. The output data 327 may be data corresponding to any of a type, a configuration, and a specification of a device used to execute a process flow. For example, the output data 327 corresponding to a device equipped with a camera may be the output data 327 that specifies performing text recognition using captured image data of the camera, as a method for inputting information. When the output data 327 is executed by a device equipped with a camera, an operator uses the camera to easily make an input with fewer burdens. The output data 327 corresponding to a device equipped with a bar-code reader may be data that specifies acquiring data read by the bar-code reader, as a method for inputting information. In the output data 327, a background color of a screen to be displayed, resolution of the screen, sizes of images and/or text to be displayed on the screen, and the like may be adjusted so as to be compatible with the HMD 100. A burden on visual performance of an operator wearing the HMD 100 can be reduced by adjusting these pieces of information.

The control unit 310 executes the process flow definition tool 322 to create and edit the process flow data 325. The control unit 310 executes the process flow definition tool 322 to generate (convert) the output data 327 from the process flow data 325.

Figure 13:
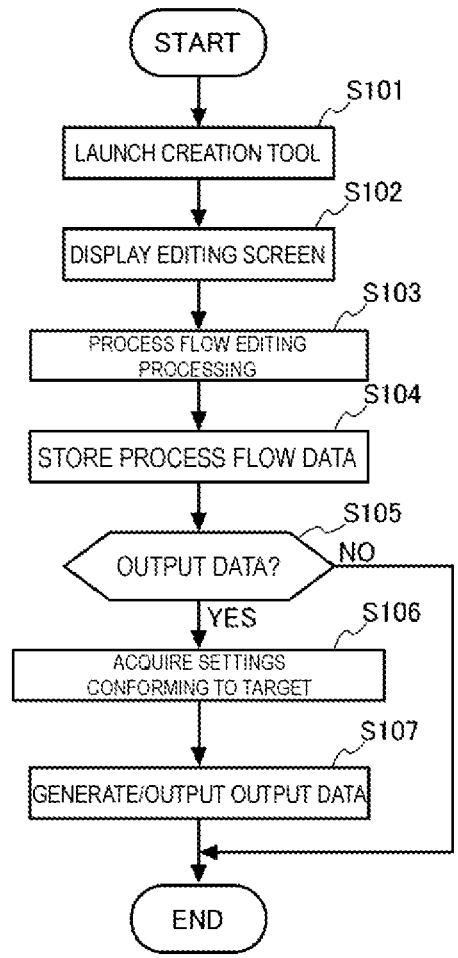
FIG. 13 shows a flowchart illustrating an operation of a control unit.

FIG. 13 is a flowchart illustrating an operation of the PC 300.

The operation in FIG. 13 is executed while the controller 310 is executing the OS 321. In response to an operation by a user, for example, the control unit 310 reads the process flow definition tool 322 from the storage unit 320 and launches the process flow definition tool 322 (step S101). The control unit 310 reads the display-related data 323, and causes the display unit 331 to display an editing screen arranged with an image and the like included in the display-related data 323 (step S102).

The control unit 310 displays an editing screen 401 (step S102), and executes process flow editing processing of creating or editing the process flow data 325 in accordance with an operation by a user (step S103). The process flow data 325 created or edited by the process flow editing processing may be the process flow data 325 for mutually causing a plurality of HMDs 100 to operate, or may be the process flow data 325 created for each HMD 100. When the process flow data 325 is created for each HMD 100, the flows in Steps S101 to S104 are executed for the number of times corresponding to the number of HMDs 100 for which the process flow data 325 is created. When the process flow data 325 corresponding to any of the plurality of HMDs 100 has already been created, the control unit 310 can edit the process flow data 325 that has already been created to create the process flow data 325 to be executed by another HMD 100.

The control unit 310 stores the process flow data 325 representing the process flow created or edited in the process flow editing processing in the storage unit 320 (step S104). When an identical process flow is already stored in the process flow data 325, the process flow data 325 is overwritten and updated.

The control unit 310 determines whether the process flow data 325 is to be output to an external device attached to the HMD 100 and the like (step S105). When outputting of the process flow data 325 is instructed with an operation by the input device 334, and the like (YES in Step S105), the control unit 310 refers to the output setting data 326, and acquires settings corresponding to a type and a function of an output-destination device (step S106). The output setting data 326 may include a setting of one general-purpose type. In this case, the control unit 310 may acquire a setting of one type, which is included in the output setting data 326.

The control unit 310 follows the setting acquired in step S106 to generate and output the output data 327 based on the process flow data 325 (step S107). In Step S107, the control unit 310 may store the output data 327 in the storage unit 320, may output the output data 327 to a device connected to the interface unit 337, or may send the output data 327 to the communication unit 336. When the output data 327 is the output data 327 generated based on the process flow data 325 to be executed by the HMD 100A, the output data 327 is output to the interface 337 connected to the HMD 100A. Similarly, when the output data 327 is the output data 327 generated based on the process flow data 325 to be executed by the HMD 100B, the output data 327 is output to the interface 337 connected to the HMD 100B. When the process flow data 325 is not to be output (NO in Step S105), the control unit 310 ends the processing.

Figure 14:
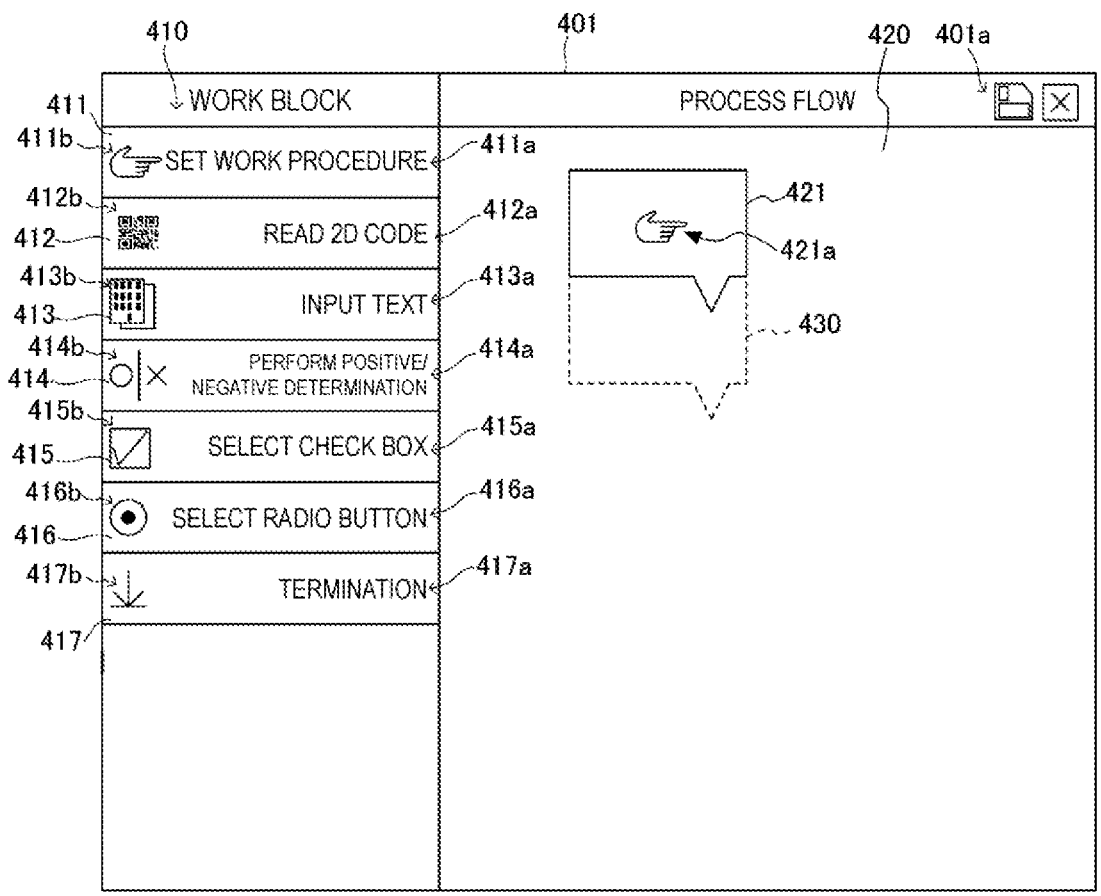
FIG. 14 shows a diagram illustrating a display example of the PC.

FIG. 14 is a diagram illustrating a display example of the PC 300, and illustrates a configuration example of the editing screen 401.

The editing screen 401 is a screen displayed through a function of the process flow definition tool 322 for creating and editing a process flow. The editing screen 401 is roughly separated into a candidate region 410 and an editing region 420. At an upper section of the editing screen 401, an instruction section 401a is arranged. The instruction section 401a includes an icon instructing end of creating and editing of a process flow, as well as including an icon instructing storing the process flow. The editing screen 401 corresponds to a "work screen" of the invention. The editing region 420 corresponds to a "work region" of the invention.

The candidate region 410 displays a list of work blocks that can be incorporated into a process flow to be created or edited. The candidate region 410 is arranged with, in regions separated per work block, text describing each of the work blocks, and icons that are images representing symbols indicating the work blocks.

In the editing screen 401 in FIG. 14, the candidate region 410 is arranged with, in line with seven work blocks, work block display sections 411, 412, 413, 414, 415, 416, and 417.

The work block display section 411 includes a work block description display section 411a as text describing that the section corresponds to a procedure display block, and an icon 411b indicating the procedure display block. The work block display section 412 includes a work block description display section 412a as text describing that the section corresponds to a read block, and an icon 412b indicating the read block. The work block display section 413 includes a work block description display section 413a as text describing that the section corresponds to an input block, and an icon 413b indicating the input block. The work block display section 414 includes a work block description display section 414a as text describing that the section corresponds to a determination block, and an icon 414b indicating the determination block. The work block display section 415 includes a work block description display section 415a as text describing that the section corresponds to a selection input block with a check box, and an icon 415b indicating the selection input block. The work block display section 416 includes a work block description display section 416a as text describing that the section corresponds to a selection input block with a radio button, and an icon 416b indicating the selection input block. The work block display section 417 includes a work block description display section 417a as text describing that the section corresponds to a termination block, and an icon 417b indicating the termination block.

The work block display sections 411 to 417 arranged in the candidate region 410 are candidates for work blocks to be incorporated into a process flow to be created and edited. A user can operate the input device 334 to select any of the work block display sections 411 to 417 and drag and drop the work block display sections selected into the editing region 420 to incorporate desired work blocks into a process flow.

The editing region 420 is a display region used to display a process flow. The editing region 420 is arranged with work blocks selected by the user from among the work block display sections 411 to 417 arranged in the candidate region 410. A process flow is created with one work block or a plurality of work blocks arranged in the editing region 420. The editing region 420 is arranged with objects represented by images corresponding to work blocks.

A user selects (drags) an icon of any one of the work blocks from the work block display section 411 and drops the selected icon into the editing region 420. When the icon is dropped into the editing region 420, an object 421 is displayed in the editing region 420. The object 421 represents the work block displayed in the work block display section 411. The object 421 includes an icon 421*a* with an image identical to the image of the icon 411*b*. With the icon 421*a*, the object 421 representing the work block in the work block display section 411 is easily and visually identified.

The editing region 420 displays a guide 430 indicating a position onto which an object can be added. The guide 430 is located below the object 421, indicating that a work block to be executed after the object 421 can be arranged. A user selects (drags) an icon of any one of the work blocks from the work block display section 411 and drops the selected icon into the guide 430. With this operation, the editing region 420 displays an object executed after the object 421 and the guide 430 indicating a position onto which an object can be added.

Figure 15:
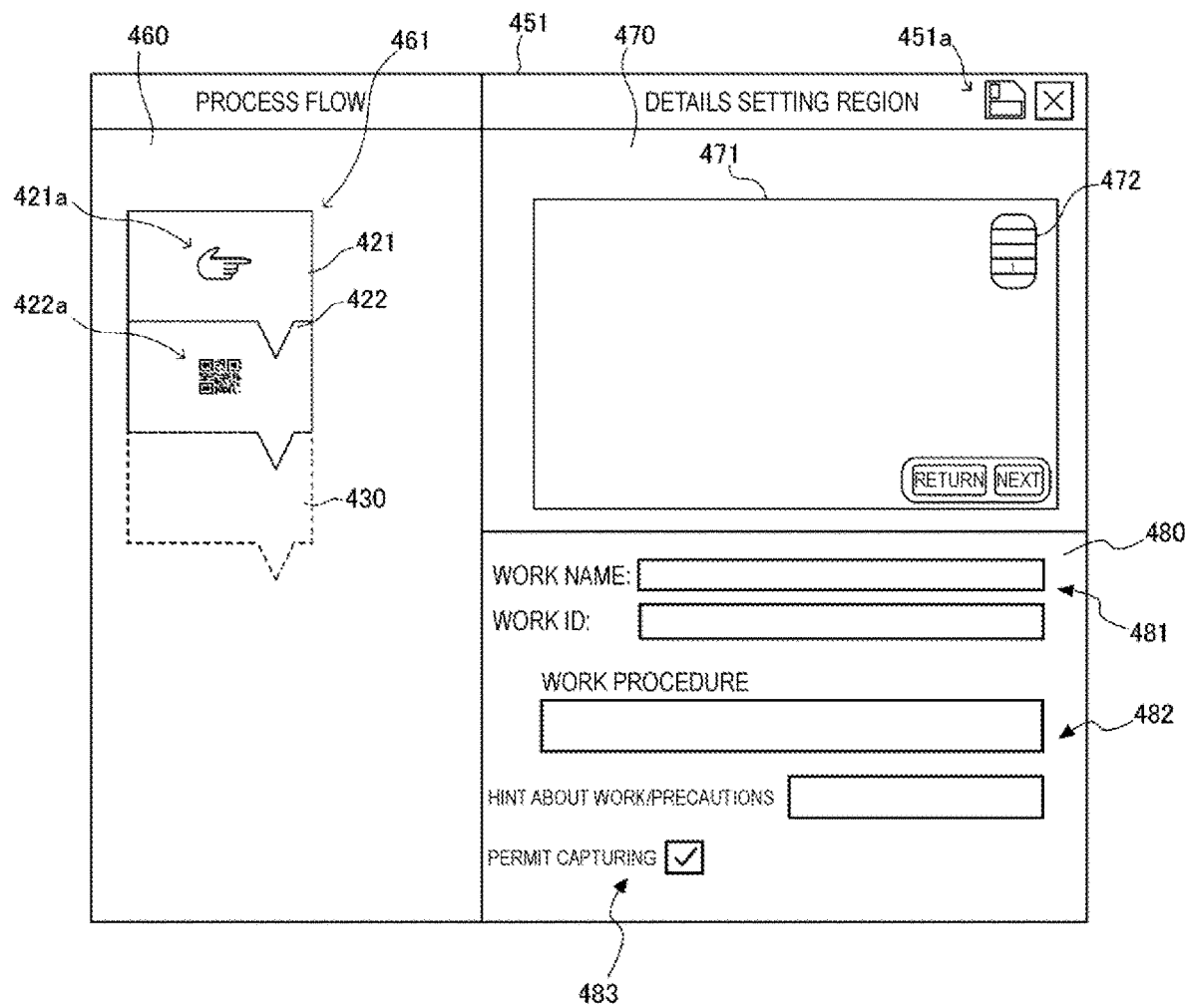
FIG. 15 shows a diagram illustrating a display example of the PC.

FIG. 15 is a diagram illustrating a display example of the PC 300, and illustrates a configuration example of a details setting screen 451. FIG. 15 illustrates an example of the details setting screen 451 being switched and displayed, with a plurality of objects arranged in the editing region 420 of the editing screen 401.

The details setting screen 451 includes a process flow display region 460, a view editing region 470, and a details setting region 480. At an upper section of the details setting screen 451, an instruction section 451*a* is arranged. The instruction section 451*a* includes an icon instructing storing of details settings, as well as includes an icon instructing ending of details setting processing.

The process flow display region 460 is a region in which a process flow 461 is displayed, and objects indicating work blocks that configure the process flow 461 are arranged in an order of execution. In the example in FIG. 15, the process flow 461 including an object 421 and an object 422 is displayed. The process flow 461 does not include an object indicating termination since the flow is still under creation. Thus, a guide 430 is displayed at a bottom of the process flow 461.

The view editing region 470 is a region used to display a configuration of a screen displayed by the HMD 100 when the HMD 100 executes the process flow 461 created in the processing. The view editing region 470 displays the configuration of the screen in accordance with any of the objects configuring the process flow 461 displayed in the process flow display region 460.

FIG. 15 illustrates a screen (referred to as a user view) 471 corresponding to the object 421 being a first object in the process flow 461 in the view editing region 470. The user view 471 includes a process display section 472 displaying an order of a plurality of work blocks included in the process flow 461. The process display section 472 is a display section notifying, to an operator, a position of a work block being executed in a whole process.

The details setting region 480 is a region used to input setting contents defined in the condition definition information 324 for the object 421 selected in the process flow 461. In the details setting region 480 in FIG. 15, a title setting section 481 and a work information setting section 482 are arranged for accepting inputs in accordance with setting contents for the object 421. The title setting section 481 includes input boxes used to input a work name and a work ID. The work information setting section 482 includes input boxes used to input contents to be displayed to an operator such as a work procedure and a hint about work.

A check box 483 indicating whether to permit use of captured image data captured by the camera 60 is displayed in the details setting region 480. When a check mark is input to the check box 483, permission information permitting use of captured image data is set in a work block corresponding to the object 421. When the check mark is removed from the check box 483, permission information rejecting the use of captured image data is set in a work block corresponding to the object 421.

As described above, the PC 300 in the exemplary embodiment is an editing device allowed to edit control data that defines a process flow including a plurality of work blocks in which an order of execution is determined.

The PC 300 includes the input unit 333, the display unit 331 configured to cause the display 332 to perform displaying, and the control unit 310.

The control unit 310 causes the display 332 to display the editing screen 401 including the editing region 420. The control unit 310 arranges objects each indicating the operation step and including an image indicating a content of the operation step in the editing region 420 in accordance with an input accepted by the input unit 333. The control unit 310 creates a process flow based on arrangement of the objects in the editing region 420 and generates the process flow data 162 that defines the created process flow.

The process flow data 162 includes a setting that determines whether use of captured image data of the camera 60 is permitted for at least any one of the operation steps.

Therefore, a process flow set with whether use of captured image data of the camera 60 is permitted for each work block can be created.

The PC 300 includes the interface unit 337 as a connection unit attached to the HMD 100. The control unit 310 outputs the output data 327 that defines a process flow created to be associated with the HMD 100 to the HMD 100 connected to the interface unit 337.

Therefore, the output data 327 executable by the HMD 100 can be output to the HMD 100 and executed.

A plurality of HMDs 100 are allowed to be connected to the interface unit 337.

The control unit 310 outputs a process flow created to be associated with each of the plurality of HMDs 100 to the corresponding HMD 100.

Therefore, the process flow created to be associated with each of the plurality of HMDs 100 can be executed by the corresponding HMD 100.

The above-described exemplary embodiment is an exemplary embodiment suitable for the invention. However, the invention is not limited to this, and various modifications can be applied to the exemplary embodiment without departing from the purpose of the invention.

For example, a transmissive head-mounted display apparatus is described as an example in the above-described exemplary embodiment. However, the head-mounted display apparatus may be non-transmissive and not allow the outside world to be visually recognized with the display device being mounted. The HMD 100 is described as an example in the exemplary embodiment, but may be a tablet PC. A projector is also applicable.

The HMD 100 may include an interface (not illustrated) that connects various external devices being supply sources of contents. For example, the interface may be an interface compatible with wired connection, such as a USB interface, a micro USB interface, a memory card interface, or may be a wireless communication interface. The external devices in this case are image supply devices that supply an image to the HMD 100. A personal computer (PC), a cellular phone terminal, a portable game machine, and the like are used. In this case, the HMD 100 can output an image and sound based on the content data 163 input from these external devices.

The above-described exemplary embodiment exemplifies the configuration in which the control device 10 and the image display unit 20 are connected to each other in the wired manner. However, the invention is not limited to this, and the image display unit 20 may be connected to the control device 10 in a wireless manner. The method exemplified as a communication method compatible with the communication unit 117 may be adopted as a wireless communication method in this case, or another communication method may be used.

A part of the functions of the control device 10 may be provided in the image display unit 20. The control device 10 may be achieved by a plurality of devices. In other words, the control device 10 is not limited to a configuration including the box-shaped case 10A. For example, a device wearable by a user on a body of the user or with clothes on may be used instead of the control device 10. For example, a device wearable by a user may be a device such as a watch-type device, a ring-type device, a laser pointer, a mouse, an air mouse, a game controller, and a pen-type device.

In the above-described exemplary embodiment, the configuration in which the image display unit 20 and the control device 10 are separated from each other and connected through the connection cable 40 is described as an example. The invention is not limited to this, and a configuration mounted on a head of the user in which the control device 10 and the image display unit 20 are integrally formed may also be used.

A laptop computer, a tablet computer, or a desktop computer may be used as the control device 10. Portable electronic devices including a game machine, a portable telephone, a smartphone, and a portable media player, or other dedicated devices may be used as the control device 10.

For example, an image display unit in another mode such as an image display unit mounted like a hat may be adopted instead of the image display unit 20. The image display unit may include a display unit configured to display an image corresponding to a left eye LE of a user and a display unit configured to display an image corresponding to a right eye RE of the user. A head-up display used instead of the image display unit 20 can be installed in vehicles such as automobiles and planes. For example, when the head-up display is installed in a vehicle, an operation surface corresponding to the operation surface of the track pad 14 is provided on a handle of the vehicle and the like.

For example, the head-up display may be formed as a head-mounted display apparatus built in a protective device such as a helmet. In this case, a section in which a position is determined with respect to a body of the user and a section in which a position is determined with respect to the section can serve as mounted sections.

The configuration in which a virtual image is formed by the half mirrors 261 and 281 in the part of the right light-guiding plate 26 and the left light-guiding plate 28 is exemplified as an optical system that guides image light to eyes of a user. The invention is not limited to this, and an image may be displayed in a display region having an area accounting for the entire surface or most of the right light-guiding plate 26 and the left light-guiding plate 28. In this case, processing of reducing an image may be included in an operation to change a display position of the image.

Furthermore, the optical element of the invention is not limited to the right light-guiding plate 26 and the left light-guiding plate 28 respectively including the half mirrors 261 and 281. The optical element may be an optical component that causes image light to be incident on eyes of a user. Specifically, a diffraction grating, a prism, and a holography display unit may be used.

Such a configuration may be adopted that at least some of the function blocks illustrated in FIGS. 6, 7, and the like are achieved with hardware, or achieved together with hardware and software. The invention is not limited to the configuration in which independent hardware resources are arranged as illustrated in the drawings. A program executed by the control unit 150 may be stored in the nonvolatile storage unit 123 or another storage device (not illustrated) in the control device 10. A program stored in an external device may be acquired and executed through the communication unit 117 and the external connector 184. The operation unit 110 in the configuration formed in the control device 10 may be formed as a user interface (UI).

A processing unit in the flowcharts illustrated in FIGS. 8, 9, and 11 is obtained by dividing processing in accordance with a main processing content to facilitate the understanding of the processing of the control unit 150 in the HMD 100. Thus, the invention is not limited by a method for dividing processing into processing units and a name. The processing of the control unit 150 can be divided into more processing units in accordance with a processing content, and can be divided such that one processing unit includes more processing. The order of processing in the above-described flowcharts is also not limited to the illustrated examples.

The same applies to the flowchart illustrating the operation of the server device 5 illustrated in FIG. 10 and the flowchart illustrating the operation of the PC 300 illustrated in FIG. 13.

The entire disclosure of Japanese Patent Application No.: 2017-236422, filed Dec. 8, 2017 is expressly incorporated by reference herein.

What is claimed is:

1. A head-mounted display apparatus mounted on a head of a user, comprising:
    a first memory configured to store control data that defines an operation flow including a plurality of operation steps performed by the user to achieve a set objective in which an order of execution of a plurality of work operations is predetermined, wherein one unit of a work operation performed by the user and one output of information to the user each corresponds to one of the plurality of operation steps in the operation flow;
    a camera configured to capture an external scene; and
    a processor configured to execute the operation flow according to the control data, wherein
    at least one of the plurality of operation steps in the control data includes a setting that determines whether image capturing and/or storage of captured image data of the camera is permitted for the at least one operation step, and
    the processor controls, when executing the operation flow, propriety of using the captured image data in each of the plurality of operation steps according to the setting of the control data about the operation step.

2. The head-mounted display apparatus according to claim 1, wherein
the processor switches, when executing the operation step, the camera between a state of being operated and a state of being stopped according to the setting of the control data about the operation step.

3. The head-mounted display apparatus according to claim 1, wherein
when executing the operation step in which the captured image data is set to be usable, the processor allows use of the captured image data corresponding to capturing by the camera for a plurality of times.

4. The head-mounted display apparatus according to claim 1, comprising:
an image memory configured to store captured image data of the camera, wherein
the processor controls, when executing the operation step, whether to use captured image data of the camera stored in the image memory according to the setting of the control data about the operation step.

5. The head-mounted display apparatus according to claim 4, comprising:
a notification unit, wherein
the processor makes notification by the notification unit when causing the first memory to store the captured image data of the camera stored in the image memory.

6. The head-mounted display apparatus according to claim 1, wherein
when executing an operation step including processing of capturing an image including code information, the processor controls use of captured image data of the camera, extracts the code information from the captured image data of the camera, and causes the first memory to store the code information.

7. The head-mounted display apparatus according to claim 6, wherein
when executing the operation step including the processing of capturing the image including code information, the processor determines a number of usable times of the captured image data based on the code information extracted from the captured image data, and allows the captured image data to be used in another operation step included in the operation flow with the number of usable times as an upper limit.

8. An editing device allowed to edit control data that defines an operation flow including a plurality of operation steps in which an order of execution is determined, comprising:
a display configured to cause a display face to perform displaying;
a first memory configured to store control data that defines the operation flow including the plurality of operation steps performed by a user to achieve a set objective in which the order of execution of a plurality of work operations is predetermined, wherein one unit of a work operation performed by the user and one output of information to the user each corresponds to one of the plurality of operation steps in the operation flow; and
a processor configured to cause the display face to display a work screen including a work region, arrange objects each indicating the operation step and including an image indicating a content of the operation step in the work region in accordance with an input accepted by the editing device, create the operation flow based on arrangement of the objects in the work region, and generate the control data that defines the operation flow created, wherein
the control data includes a setting that determines whether image capturing and/or storage of captured image data of a camera is permitted for at least one of the operation steps.

9. The editing device according to claim 8, comprising:
a connection circuit attached to a head-mounted display apparatus, wherein
the processor outputs the control data that defines the operation flow created to be associated with the head-mounted display apparatus to the head-mounted display apparatus connected to the connection circuit.

10. The editing device according to claim 8, wherein
a plurality of the head-mounted display apparatuses are allowed to be connected to the connection circuit, and
the processor outputs the control data that defines the operation flow created to be associated with each of the plurality of head-mounted display apparatuses to the head-mounted display apparatus connected to the connection circuit.

11. An information processing system that comprises a head-mounted display apparatus mounted on a head of a user and an information processing device, wherein
the head-mounted display apparatus includes
a first communication circuit configured to perform communication,
a first memory configured to store control data that defines an operation flow including a plurality of operation steps performed by the user to achieve a set objective in which an order of execution of a plurality of work operations is predetermined, wherein one unit of a work operation performed by the user and one output of information to the user each corresponds to one of the plurality of operation steps in the operation flow,
a camera configured to capture an external scene, and
a first processor configured to execute the operation flow according to the control data,
at least one of the operation steps in the control data includes a setting that determines whether image capturing and/or storage of captured image data of the camera is permitted for the at least one operation step, and
the first processor controls, when executing the operation flow, propriety of using the captured image data in each of the operation steps according to the setting of the control data about the operation step, and sends, when use of the captured image data is permitted, the captured image data captured by the camera from the first communication circuit to the information processing device.

12. The information processing system according to claim 11, wherein
the first processor adds limited information limiting use of the captured image data to the captured image data and sends the captured image data to the information processing device.

13. The information processing system according to claim 11, wherein
the first processor adds first identification information identifying the head-mounted display apparatus to the captured image data and sends the captured image data to the information processing device.

14. The information processing system according to claim 13, wherein
the information processing device includes
a second communication circuit configured to perform communication, a second memory configured to
- associate the captured image data received from the head-mounted display apparatus with the first identification information, and store the data, and
- associate second identification information identifying an external device in which the captured image data is usable with the first identification information of the head-mounted display apparatus from which the external device corresponding to the second identification information is allowed to acquire captured image data, and store the information, and a second processor configured to determine, when receiving the second identification information from the second communication circuit, whether the second identification information coinciding with the second identification information received is stored in the second memory, and send, when the second identification information that is identical is stored in the second memory, the captured image data in the first identification information associated with the second identification information that is identical to the external device that has received the second identification information.

15. A method for controlling a head-mounted display apparatus mounted on a head of a user, comprising:

storing control data that defines an operation flow including a plurality of operation steps performed by the user to achieve a set objective in which an order of execution of a plurality of work operations is predetermined, wherein one unit of a work operation performed by the user and one output of information to the user each corresponds to one of the plurality of operation steps in the operation flow;

capturing an external scene by a camera;

executing control data that defines the operation flow;

controlling the camera according to a setting that determines whether image capturing and/or storage of captured image data of the camera is permitted for each of the plurality of operation steps, the setting being included in each of the plurality of operation steps to be executed; and controlling, when executing the operation flow, propriety of using the captured image data in each of the plurality of operation steps according to the setting.

* * * * *